US012320180B2

(12) United States Patent
Shank et al.

(10) Patent No.: US 12,320,180 B2
(45) **Date of Patent: *Jun. 3, 2025**

(54) VEHICLE ASSEMBLY HAVING A CAPACITIVE SENSOR

(71) Applicant: UUSI, LLC, Reed City, MI (US)

(72) Inventors: David W. Shank, Hersey, MI (US); Justin L. Paquette, Manton, MI (US)

(73) Assignee: UUSI, LLC, Reed City, MI (US)

( * ) Notice: Subject to any disclaimer, the term of this patent is extended or adjusted under 35 U.S.C. 154(b) by 256 days.

This patent is subject to a terminal disclaimer.

(21) Appl. No.: 17/973,401

(22) Filed: Oct. 25, 2022

(65) Prior Publication Data

US 2023/0101679 A1 Mar. 30, 2023

Related U.S. Application Data

(63) Continuation-in-part of application No. 16/952,569, filed on Nov. 19, 2020, now Pat. No. 11,634,937, which is a continuation-in-part of application No. 15/711,944, filed on Sep. 21, 2017, now Pat. No. 10,954,709, which is a continuation-in-part of application No. 14/730,420, filed on Jun. 4, 2015, now Pat. No. 9,797,179, which is a continuation of application No. 13/948,406, filed on Jul. 23, 2013, now Pat. No. 9,051,769, which is a continuation-in-part of application No. 13/221,167, filed on Aug. 30, 2011, now Pat. No. 9,845,629, which is a continuation-in-part of application No. 13/084,611, filed on Apr. 12, 2011, now Pat. No. 9,575,481, which is a continuation-in-part of application No. 12/942,294, filed on Nov. 9, 2010, now Pat. No. 9,199,608, which is a (Continued)

(51) Int. Cl.
*E05F 15/46* (2015.01)
*E05F 15/40* (2015.01)

(52) U.S. Cl.
CPC .............. *E05F 15/46* (2015.01); *E05F 15/40* (2015.01); *E05Y 2900/546* (2013.01)

(58) Field of Classification Search
CPC ...................................................... E05F 15/46
See application file for complete search history.

(56) References Cited

U.S. PATENT DOCUMENTS

| | | |
|---|---|---|
| 2,476,111 A | 7/1949 | Opalek |
| 3,830,018 A | 8/1974 | Arai et al. |

(Continued)

FOREIGN PATENT DOCUMENTS

| | | |
|---|---|---|
| AT | 414 005 B | 8/2006 |
| CN | 201158356 Y | 12/2008 |

(Continued)

*Primary Examiner* — Michael A Berns
(74) *Attorney, Agent, or Firm* — Howard & Howard Attorneys PLLC

(57) ABSTRACT

A bus includes a vehicle body, a plurality of doors, a weather seal, at least one sensor disposed inside the weather seal, wherein the at least one sensor capacitively couples to an electrically conductive moving object proximal to the weather seal such that the capacitance of the at least one sensor changes, and a controller coupled to the at least one sensor, the controller analyzing the sensing by the at least one sensor and being configured to alert an operator of the bus when the obstruction is present.

28 Claims, 30 Drawing Sheets

Related U.S. Application Data continuation-in-part of application No. 12/784,010, filed on May 20, 2010, now Pat. No. 10,017,977, which is a continuation-in-part of application No. 12/545,178, filed on Aug. 21, 2009, now Pat. No. 9,705,494.

(56) References Cited

U.S. PATENT DOCUMENTS

| | | | |
|---|---|---|---|
| 3,855,733 | A | 12/1974 | Miller |
| 4,178,621 | A | 12/1979 | Simonelic et al. |
| 4,410,843 | A | 10/1983 | Sauer et al. |
| 4,422,521 | A | 12/1983 | Mochida |
| 4,933,807 | A | 6/1990 | Duncan |
| 5,361,018 | A | 11/1994 | Milton et al. |
| 5,394,292 | A | 2/1995 | Hayashida |
| 5,493,277 | A | 2/1996 | Pierce et al. |
| 5,621,290 | A | 4/1997 | Heller et al. |
| 5,730,165 | A | 3/1998 | Phillip |
| 5,801,340 | A | 9/1998 | Peter |
| 5,952,801 | A | 9/1999 | Boisvert et al. |
| 5,959,538 | A | 9/1999 | Schousek |
| 6,185,872 | B1 | 2/2001 | Seeberger et al. |
| 6,188,228 | B1 | 2/2001 | Philipp |
| 6,233,872 | B1 | 5/2001 | Glagow et al. |
| 6,337,549 | B1 | 1/2002 | Bledin |
| 6,340,199 | B1 | 1/2002 | Fukumoto et al. |
| 6,377,009 | B1 | 4/2002 | Philipp |
| 6,389,752 | B1 | 5/2002 | Rosenau |
| 6,404,158 | B1 | 6/2002 | Boisvert et al. |
| 6,431,638 | B1 | 8/2002 | Mrozowski et al. |
| 6,498,214 | B2 | 12/2002 | Laughner et al. |
| 6,499,359 | B1 | 12/2002 | Washeleski et al. |
| 6,555,982 | B2 | 4/2003 | Tyckowski |
| 6,573,678 | B2 | 6/2003 | Losey et al. |
| 6,611,202 | B2 | 8/2003 | Schofield et al. |
| 6,700,393 | B2 | 3/2004 | Haag et al. |
| 6,723,933 | B2 | 4/2004 | Haag et al. |
| 6,782,759 | B2 | 8/2004 | Shank et al. |
| 6,879,250 | B2 | 4/2005 | Fayt et al. |
| 6,933,831 | B2 | 8/2005 | Ieda et al. |
| 6,936,986 | B2 | 8/2005 | Nuber |
| 6,946,853 | B2 | 9/2005 | Gifford et al. |
| 6,968,746 | B2 | 11/2005 | Shank et al. |
| 6,980,095 | B2 | 12/2005 | Wright et al. |
| 7,015,666 | B2 | 3/2006 | Staus |
| 7,038,414 | B2 | 5/2006 | Daniels et al. |
| 7,055,885 | B2 | 6/2006 | Ishihara et al. |
| 7,084,859 | B1 | 8/2006 | Pryor |
| 7,116,117 | B2 | 10/2006 | Nakano et al. |
| 7,126,453 | B2 | 10/2006 | Sandau et al. |
| 7,132,642 | B2 | 11/2006 | Shank et al. |
| 7,152,907 | B2 | 12/2006 | Salhoff et al. |
| 7,162,928 | B2 | 1/2007 | Shank et al. |
| 7,219,945 | B1 | 5/2007 | Zinn et al. |
| 7,248,151 | B2 | 7/2007 | McCall |
| 7,255,466 | B2 | 8/2007 | Schmidt et al. |
| 7,260,454 | B2 | 8/2007 | Pickering et al. |
| 7,293,467 | B2 | 11/2007 | Shank et al. |
| 7,312,591 | B2 | 12/2007 | Washeleski et al. |
| 7,333,090 | B2 | 2/2008 | Tanaka et al. |
| 7,342,373 | B2 | 3/2008 | Newman et al. |
| 7,354,097 | B2 | 4/2008 | Jackson et al. |
| 7,375,299 | B1 | 5/2008 | Pudney |
| 7,424,347 | B2 | 9/2008 | Babala et al. |
| 7,424,377 | B2 | 9/2008 | Hamilton et al. |
| 7,444,870 | B2 | 11/2008 | Uchiyama et al. |
| 7,449,852 | B2 | 11/2008 | Washeleski et al. |
| 7,513,158 | B2 | 4/2009 | Watanabe et al. |
| 7,513,166 | B2 | 4/2009 | Shank et al. |
| 7,518,327 | B2 | 4/2009 | Newman et al. |
| 7,525,062 | B2 | 4/2009 | Adam et al. |
| 7,538,672 | B2 | 5/2009 | Lockyer et al. |
| 7,547,058 | B2 | 6/2009 | King et al. |
| 7,548,809 | B2 | 6/2009 | Westerhoff |
| 7,576,631 | B1 | 8/2009 | Bingle et al. |
| 7,706,046 | B2 | 4/2010 | Bauer et al. |
| 7,710,245 | B2 | 5/2010 | Pickering |
| 7,733,332 | B2 | 6/2010 | Steenwyk et al. |
| 7,812,721 | B2 | 10/2010 | Joshina et al. |
| 7,893,831 | B2 | 2/2011 | Hoshina et al. |
| 7,976,749 | B2 | 7/2011 | Volkel et al. |
| 7,989,725 | B2 | 8/2011 | Boddie et al. |
| 8,033,052 | B2 | 10/2011 | Kraus et al. |
| 8,111,075 | B2 | 2/2012 | Uhov et al. |
| 8,154,418 | B2 | 4/2012 | Peterson et al. |
| 8,321,174 | B1 | 11/2012 | Moyal et al. |
| 8,421,482 | B2 | 4/2013 | Wuerstlein et al. |
| 8,572,891 | B2 | 11/2013 | Pribisic |
| 8,589,033 | B2 | 11/2013 | Rafii et al. |
| 8,635,809 | B2 | 1/2014 | Wuerstlein et al. |
| 8,874,324 | B2 | 10/2014 | Eggers et al. |
| 9,051,769 | B2 | 6/2015 | Washeleski et al. |
| 9,114,691 | B2 | 8/2015 | Kawaguchi et al. |
| 9,199,608 | B2 | 12/2015 | Newman et al. |
| 9,441,408 | B2 | 9/2016 | Matsumoto et al. |
| 9,575,481 | B2 | 2/2017 | Newman et al. |
| 9,605,939 | B2 | 3/2017 | van Gastel et al. |
| 9,705,494 | B2 | 7/2017 | Newman et al. |
| 9,797,179 | B2 | 10/2017 | Washeleski et al. |
| 9,845,629 | B2 | 12/2017 | Washeleski et al. |
| 10,017,977 | B2 | 7/2018 | Newman et al. |
| 10,161,765 | B2 | 12/2018 | Schulz |
| 10,168,187 | B2 | 1/2019 | Schulz |
| 10,196,037 | B2 | 2/2019 | Nicholls et al. |
| 10,288,598 | B2 | 5/2019 | Koizumi et al. |
| 10,409,426 | B2 | 9/2019 | Buttolo et al. |
| 10,662,692 | B2 | 5/2020 | Brueckner et al. |
| 10,954,709 | B2 | 3/2021 | Washeleski et al. |
| 11,634,937 | B2 * | 4/2023 | Washeleski ............. E05F 15/46 701/36 |
| 2001/0026244 | A1 | 10/2001 | Ieda et al. |
| 2001/0052839 | A1 | 12/2001 | Nahata et al. |
| 2002/0125994 | A1 | 9/2002 | Sandau et al. |
| 2003/0071727 | A1 | 4/2003 | Haag et al. |
| 2003/0122794 | A1 | 7/2003 | Caldwell |
| 2003/0216817 | A1 | 11/2003 | Pudney |
| 2004/0124662 | A1 | 7/2004 | Cleland et al. |
| 2004/0140045 | A1 | 7/2004 | Burgess et al. |
| 2004/0233677 | A1 | 11/2004 | Su et al. |
| 2005/0073852 | A1 | 4/2005 | Ward |
| 2005/0090946 | A1 | 4/2005 | Pickering et al. |
| 2005/0092097 | A1 | 5/2005 | Shank et al. |
| 2005/0187689 | A1 | 8/2005 | Westerhoff |
| 2005/0270620 | A1 | 12/2005 | Bauer et al. |
| 2006/0026521 | A1 | 2/2006 | Hotelling et al. |
| 2006/0145825 | A1 | 7/2006 | McCall |
| 2006/0177212 | A1 | 8/2006 | Lamborghini et al. |
| 2006/0238385 | A1 | 10/2006 | Steenwyk et al. |
| 2007/0089527 | A1 | 4/2007 | Shank et al. |
| 2007/0096904 | A1 | 5/2007 | Lockyer et al. |
| 2007/0152615 | A1 | 7/2007 | Newman et al. |
| 2007/0171057 | A1 | 7/2007 | Ogino et al. |
| 2007/0195542 | A1 | 8/2007 | Metros et al. |
| 2007/0276550 | A1 | 11/2007 | Desai et al. |
| 2007/0296242 | A1 | 12/2007 | Frommer et al. |
| 2008/0024451 | A1 | 1/2008 | Aimi et al. |
| 2008/0142593 | A1 | 6/2008 | Walsh et al. |
| 2008/0202912 | A1 | 8/2008 | Boddie et al. |
| 2009/0000196 | A1 | 1/2009 | Kollar et al. |
| 2009/0044449 | A1 | 2/2009 | Appel et al. |
| 2009/0219134 | A1 | 9/2009 | Nakasato et al. |
| 2009/0243824 | A1 | 10/2009 | Peterson et al. |
| 2010/0024301 | A1 | 2/2010 | Wuerstlein et al. |
| 2010/0079387 | A1 | 4/2010 | Rosenblatt et al. |
| 2010/0096193 | A1 | 4/2010 | Yilmaz et al. |
| 2010/0097469 | A1 | 4/2010 | Blank et al. |
| 2010/0219935 | A1 | 9/2010 | Bingle et al. |
| 2010/0287837 | A1 | 11/2010 | Wuerstlein et al. |
| 2011/0001550 | A1 | 1/2011 | Schoen |
| 2011/0041409 | A1 | 2/2011 | Newman et al. |
| 2011/0043325 | A1 | 2/2011 | Newman et al. |
| 2011/0057773 | A1 | 3/2011 | Newman et al. |
| 2011/0187492 | A1 | 8/2011 | Newman et al. |

(56) References Cited

U.S. PATENT DOCUMENTS

| | | | | |
|---|---|---|---|---|
| 2011/0313619 | A1 | 12/2011 | Washeleski et al. | |
| 2011/0316304 | A1 | 12/2011 | Schwaiger et al. | |
| 2012/0182141 | A1 | 7/2012 | Peterson et al. | |
| 2012/0192489 | A1 | 8/2012 | Pribisic | |
| 2012/0219935 | A1 | 8/2012 | Stebbings et al. | |
| 2015/0267453 | A1 | 9/2015 | Matsumoto et al. | |
| 2016/0025520 | A1 | 1/2016 | Pribisic et al. | |
| 2021/0087868 | A1 | 3/2021 | Washeleski et al. | |
| 2023/0101679 | A1* | 3/2023 | Shank | E05F 15/44<br>701/36 |

FOREIGN PATENT DOCUMENTS

| | | | |
|---|---|---|---|
| DE | 10 2006 009 998 | A1 | 9/2007 |
| DE | 10 2015 105 274 | B4 | 4/2019 |
| EP | 1 247 696 | A1 | 10/2002 |
| EP | 1 991 751 | A1 | 11/2008 |
| WO | 89/08952 | A1 | 9/1989 |
| WO | 02/12669 | A1 | 2/2002 |
| WO | 03/038220 | A1 | 5/2003 |
| WO | 2007/098746 | A1 | 9/2007 |
| WO | 2009/136178 | A1 | 11/2009 |

* cited by examiner

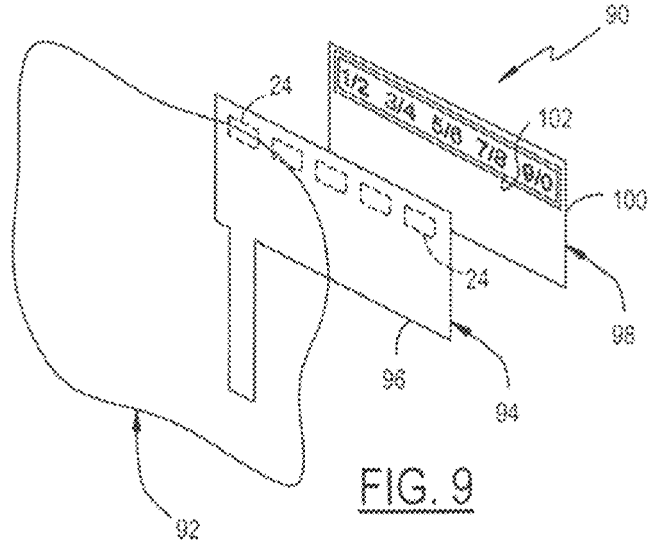
FIG. 9
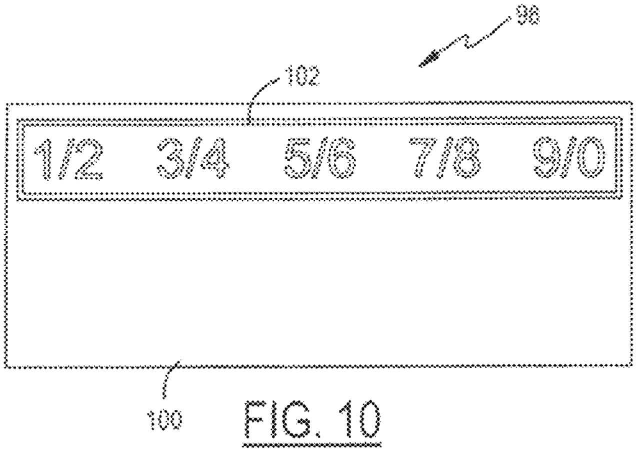
FIG. 10
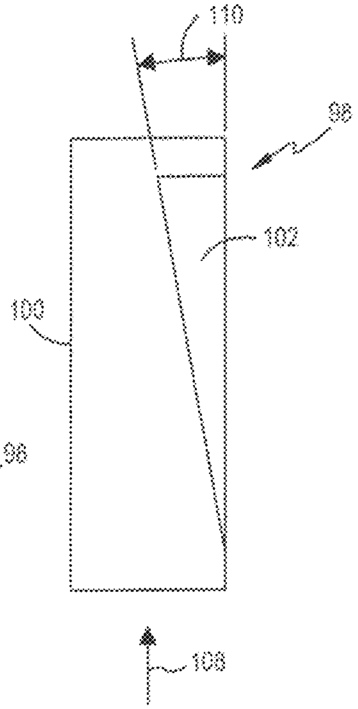
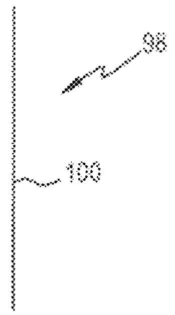
FIG. 11A
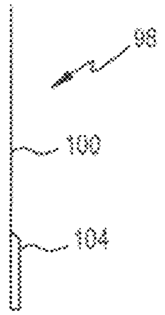
FIG. 11B
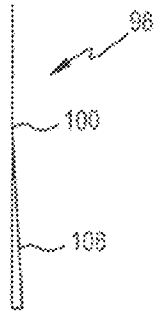
FIG. 11C
FIG. 12

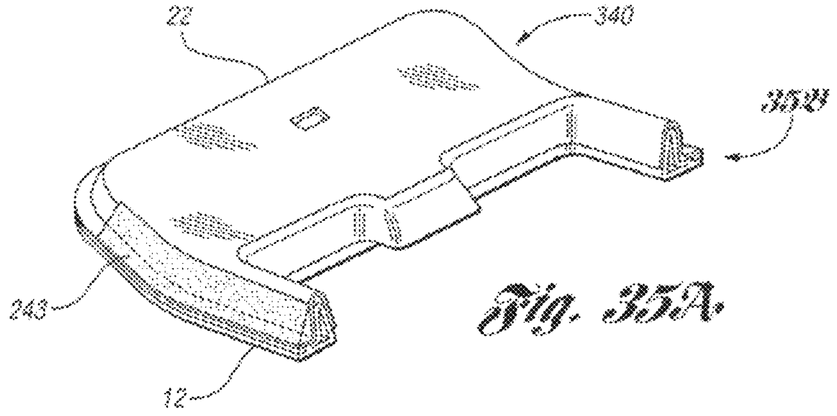
Fig. 35A.
Fig. 35B
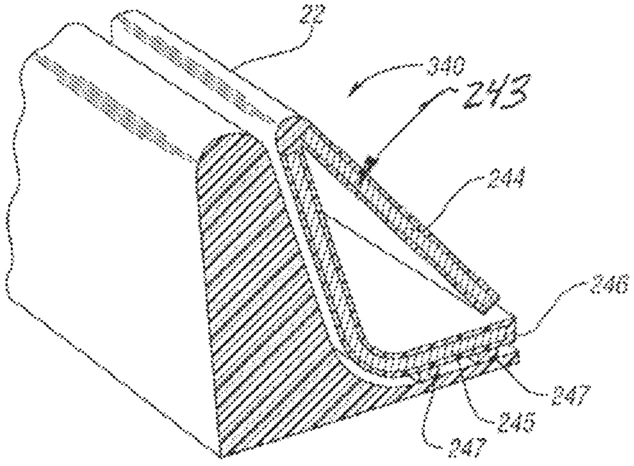
Fig. 36
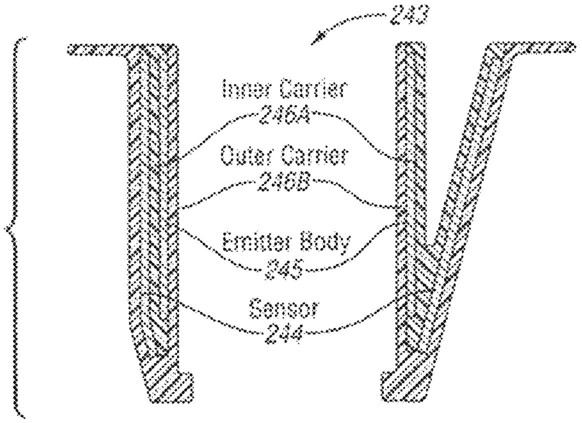

VEHICLE ASSEMBLY HAVING A CAPACITIVE SENSOR

CROSS-REFERENCE TO RELATED APPLICATIONS

This application is a continuation-in-part of U.S. application Ser. No. 16/952,569, filed Nov. 19, 2020, which is a continuation-in-part of U.S. application Ser. No. 15/711,944, filed Sep. 21, 2017 (now U.S. Pat. No. 10,954,709, issued Mar. 23, 2021), which is a continuation-in-part of U.S. application Ser. No. 14/730,420, filed Jun. 4, 2015 (now U.S. Pat. No. 9,797,179, issued Oct. 24, 2017), which is a continuation of U.S. application Ser. No. 13/948,406, filed Jul. 23, 2013 (now U.S. Pat. No. 9,051,769, issued Jun. 9, 2015), which is a continuation-in-part of U.S. application Ser. No. 13/221,167, filed Aug. 30, 2011 (now U.S. Pat. No. 9,845,629, issued Dec. 19, 2017), which is a continuation-in-part of U.S. application Ser. No. 13/084,611, filed Apr. 12, 2011 (now U.S. Pat. No. 9,575,481, issued Feb. 21, 2017), which is a continuation-in-part of U.S. application Ser. No. 12/942,294, filed Nov. 9, 2010 (now U.S. Pat. No. 9,199, 608, issued Dec. 1, 2015), which is a continuation-in-part of U.S. application Ser. No. 12/784,010, filed May 20, 2010 (now U.S. Pat. No. 10,017,977, issued Jul. 10, 2018), which is a continuation-in-part of U.S. application Ser. No. 12/545, 178, filed Aug. 21, 2009 (now U.S. Pat. No. 9,705,494, issued Jul. 11, 2017); the disclosures of which are hereby incorporated by reference.

U.S. Pat. Nos. 9,051,769, 7,513,166 and 7,342,373 are also hereby incorporated by reference.

TECHNICAL FIELD

The subject matter of this document relates to object detection and anti-entrapment for vehicles.

SUMMARY

An illustrative assembly includes panels and a capacitive sensor. The panels are movable between an opened position and a closed position relative to an aperture of a vehicle body. The sensor is positioned on a panel such that at least a portion of the sensor will come into proximity or contact of a person or thing that is proximal to the closing edges of the panels as they are moving between an open position and closed position.

The various features and advantages of this invention will become apparent to those skilled in the art from the following detailed description. The drawings that accompany the detailed description can be briefly described as follows.

BRIEF DESCRIPTION OF THE DRAWINGS

FIG. 9 illustrates a vehicle keyless entry assembly in accordance with another embodiment of the present invention;

FIG. 10 illustrates an enlarged view of the light pipe assembly of the vehicle keyless entry assembly shown in FIG. 9;

FIGS. 11A, 11B, and 11C respectively illustrate cross-sectional views of the body portion of the light pipe assembly of the vehicle keyless entry assembly shown in FIG. 9;

FIG. 12 illustrates etching of the button indicator into the body portion of the light pipe assembly of the vehicle keyless entry assembly shown in FIG. 9;

FIG. 35A illustrates a perspective view of the lift gate and the fascia panel thereon of the vehicle lift gate assembly shown in FIG. 33A;

FIG. 35B illustrates the cross-section "35B" of FIG. 35A where the sensor along the edge of the lift gate and the fascia panel is configured for both electrically conductive and non-conductive object detection;

FIG. 36 illustrates a cross-sectional view of the sensor along the edge of the lift gate and the fascia panel of FIG. 35A;

DETAILED DESCRIPTION

Figure 1A:
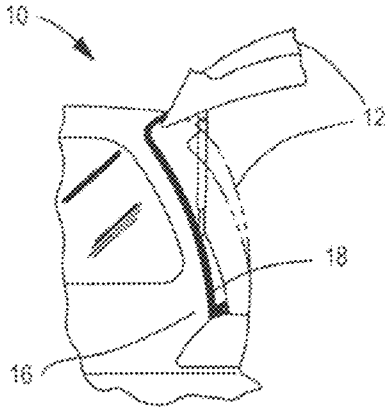
FIG. 1A illustrates a side view of a vehicle lift gate assembly having a lift gate.
Figure 1B:
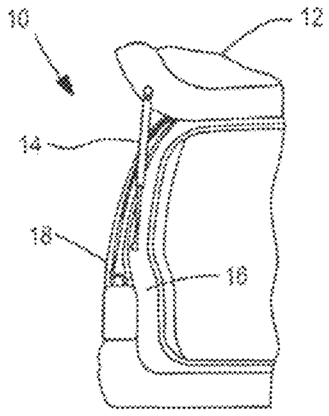
FIG. 1B illustrates a rear view of the vehicle lift gate assembly shown in FIG. 1A.

Referring now to FIGS. 1A and 1B, a vehicle lift gate assembly 10 having a lift gate 12 is shown. Lift gate 12 is connected by a cylinder 14 or the like to a body panel 16 of a vehicle. Cylinder 14 includes a piston rod which extends to move lift gate 12 to an opened position with respect to body panel 16 and contracts to move lift gate 12 to a closed position with respect to body panel 16 (lift gate 12 in the closed position is shown as a dotted line in FIG. 1A). A capacitance sensor 18 is mounted along body panel 16. Sensor 18 is operable for detecting the presence of an electrically conductive object such as a human body part extending into the opening between lift gate 12 and body panel 16 when the object is proximal to body panel 16.

Sensor 18 is part of an anti-entrapment system which includes a controller. Sensor 18 generally includes separated first and second electrically conductive conductors with a dielectric element therebetween. The conductors are set at different voltage potentials with respect to one another with one of the conductors typically being set at electrical ground. Sensor 18 has an associated capacitance which is a function of the different voltage potentials applied to the conductors. The capacitance of sensor 18 changes in response to the conductors being physically moved relative to one another such as when an object (either electrically conductive or non-conductive) touches sensor 18. Similarly, the capacitance of sensor 18 changes when an electrically conductive object comes into proximity with the conductor of sensor 18 that is not electrically grounded. As such, sensor 18 is operable to detect an object on sensor 18 (i.e., an object touching sensor 18) and/or the presence of an object near sensor 18 (i.e., an object in proximity to sensor 18).

The controller is in communication with sensor 18 to monitor the capacitance of sensor 18. When the capacitance of sensor 18 indicates that an object is near or is touching sensor 18 (i.e., an object is near or is touching vehicle body panel 16 to which sensor 18 is mounted), the controller controls lift gate 12 accordingly via cylinder 14. For instance, the controller controls lift gate 12 to halt movement in the closing direction when sensor 18 detects the presence of an object near sensor 18. In this case, the object may be a human such as a child and the controller halts the closing movement of lift gate 12 to prevent lift gate 12 from closing on the child. In this event, the controller may further control lift gate 12 to cause lift gate 12 to move in the opening direction in order to provide the child with room to move between the vehicle and lift gate 12 if needed. Instead of being mounted on body panel 16 as shown in FIGS. 1A and 1B, sensor 18 can be mounted on a closing member such as lift gate 12 or on any other closure opening where anti-trap is required. That is, sensor 18 can be located on body panel 16 or on a closing member like lift gate 12 or on any closure opening where an anti-trap is desired or required.

Figure 2:
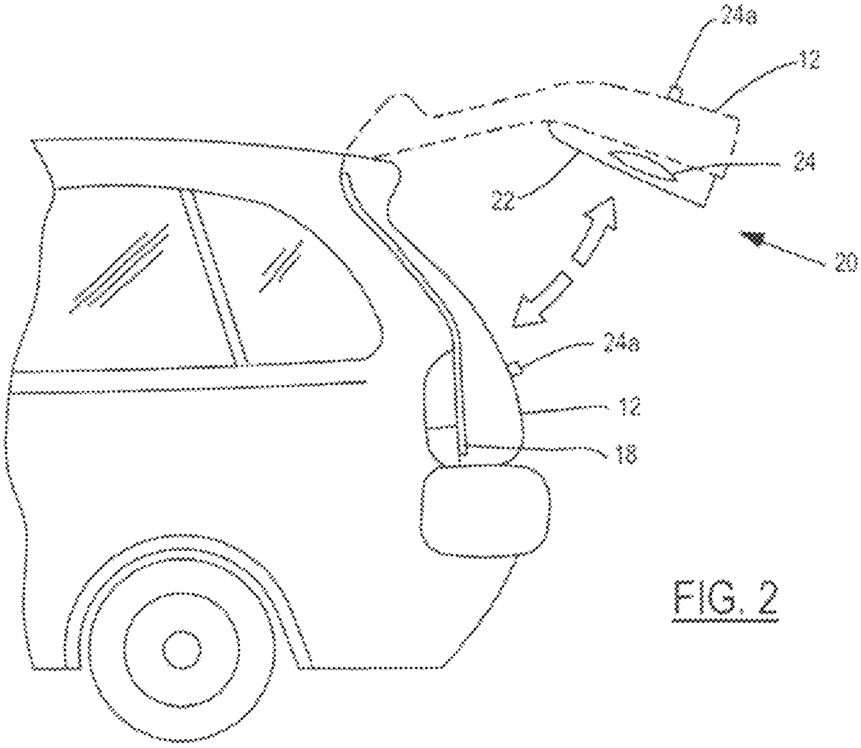
FIG. 2 illustrates a side view of a vehicle lift gate assembly having a lift gate and a fascia panel thereon with the fascia panel having a capacitance sensor in accordance with an embodiment of the present invention.

Referring now to FIG. 2, with continual reference to FIGS. 1A and 1B, a side view of a vehicle lift gate assembly 20 in accordance with an embodiment of the present invention is shown. Lift gate assembly 20 includes lift gate 12 which is movable between opened and closed positions with respect to vehicle body panel 16. Lift gate assembly 20 includes sensor 18 which is mounted along body panel 16 and is operable for detecting the presence of an electrically conductive object extending into the opening between lift gate 12 and body panel 16 when the object is touching or is proximal to sensor 18.

Lift gate assembly 20 differs from lift gate assembly 10 shown in FIGS. 1A and 1B in that lift gate 12 of lift gate assembly 20 includes an interior fascia panel 22 having a capacitance sensor 24. Fascia panel 22 is mounted to the interior surface of lift gate 12. Sensor 24 is mounted to the interior surface of fascia panel 22 which faces the vehicle interior when lift gate 12 is closed. As such, sensor 24 is between fascia panel 22 and lift gate 12. Alternatively, sensor 24 may be within fascia panel 22 or mounted to an exterior surface of fascia panel 22. That is, sensor 24 can be mounted internal to fascia panel 22 or on the exterior of fascia panel 22.

Like sensor 18, sensor 24 is part of an anti-entrapment system which includes a controller and is operable for detecting the presence of an electrically conductive object such as a human body part in proximity to sensor 24. Sensor 24 includes an electrically conductive conductor like the first conductor of sensor 18, but does not include another conductor like the second conductor of sensor 18. In general, the conductor of sensor 24 (i.e., sensor 24 itself) capacitively couples to an electrically conductive object which is in either proximity to or is touching sensor 24 while sensor 24 is driven with an electrical charge. The controller is in communication with sensor 24 to monitor the capacitive coupling of sensor 24 to the object. The controller determines that an object is in proximity to or is touching sensor 24 (when sensor 24 is exposed to contact) upon detecting the capacitive coupling of sensor 24 to the object. In turn, the controller controls lift gate 12 accordingly.

As sensor 24 is mounted to fascia panel 22 which is mounted to lift gate 12, sensor 24 is operable for detecting the presence of an electrically conductive object extending into the opening between lift gate 12 and the vehicle body when the object is proximal to fascia panel 22 (as opposed to when the object is proximal to vehicle body panel 16 as provided by sensor 18). As such, sensor 24 expands the anti-entrapment capability compared to that of lift gate assembly 10 for detecting the presence of an object in the travel path of lift gate 12. An example is that sensor 24, which is located within fascia panel 22, can detect the presence of a person standing under an open lift gate 12 to thereby prevent fascia panel 22 (and thereby lift gate 12) from contacting the person as lift gate 12 is closing. To this end, when detection occurs, the controller halts downward travel and reverses movement of lift gate 12 back to the opened position. If desired, sensor 24 and the controller can be configured to monitor for a person in close proximity to lift gate 12 to prevent lift gate 12 from opening. For example, this detection prevents a person such as a child from accidentally falling out of the vehicle when lift gate 12 is partially opened. An alternative location for sensor 24 can be along each outer edge of lift gate opening.

Figure 3A:
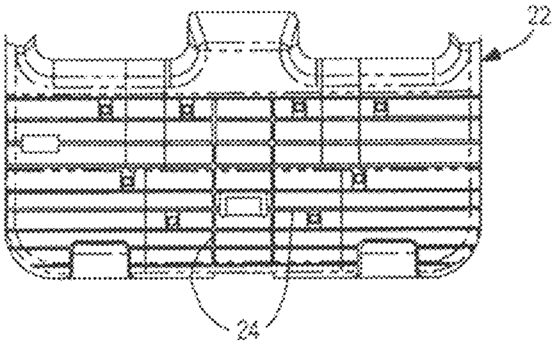
FIG. 3A illustrates an interior view of the fascia panel and the sensor of the vehicle lift gate assembly shown in FIG. 2.
Figure 3B:
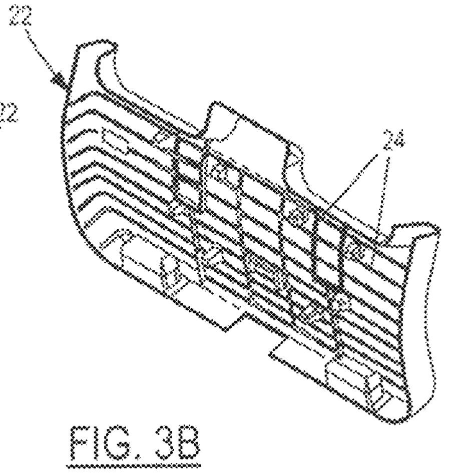
FIG. 3B illustrates an angled interior view of the fascia panel and the sensor of the vehicle lift gate assembly shown in FIG. 2.

Referring now to FIGS. 3A and 3B, with continual reference to FIG. 2, interior views of fascia panel 22 and sensor 24 of vehicle lift gate assembly 20 are shown. As indicated above, sensor 24 is placed on the interior surface of fascia panel 22 which faces the vehicle interior when lift gate 12 is closed. That is, sensor 24 is placed on the interior surface of fascia panel 22 which is farthest from lift gate 12. FIGS. 3A and 3B illustrate this interior surface of fascia panel 22.

As shown in FIGS. 3A and 3B, sensor 24 is formed from an array of electrically conductive strips which are placed vertically and horizontally across the interior surface of fascia panel 22. The strips of sensor 24 are in electrical connectivity to each other and together form the conductor of sensor 24 (i.e., the strips together are sensor 24). The strips of sensor 24 extend across this interior surface of fascia panel 22 following the contour of fascia panel 22. In this embodiment, fascia panel 22 is made of non-conductive plastic material which allows sensor 24 to detect the presence of conductive objects through fascia panel 22.

Sensor 24 can be placed on the external surface of fascia panel 22 which directly faces the vehicle interior when lift gate 12 is closed. However, placement of sensor 24 on the interior surface of fascia panel 22 hides sensor 24 from user view and protects sensor 24 against potential damage. Sensor 24 can also be over-molded on any surface of fascia panel 22 allowing for additional protection from damage caused by assembly or other handling.

The strips of sensor 24 can be configured into other array patterns utilizing angle or curvature combinations that may better optimize object detection objectives. Sensor 24 can be tailored and applied in any deliberate pattern to customize and enhance object detection performance. The distance between each strip is sufficient to provide continuous object detection coverage across the surface of fascia panel 22. Other configurations in place of the strips of sensor 24 include a solid sheet of electrically conductive material such as copper or aluminum foil, a conductive array or screen that is stamped, woven, or braided, multiple conductive decal-like shapes placed about the interior surface of fascia panel 22 and electrically interconnected, etc. The strips of sensor 24 are fabricated from copper, but may be fabricated from other materials including carbon inks, fabrics, plastics, elastomers, or other metals like aluminum, brass, bronze, and the like. There are various known methods to achieve electrical conductivity in fabrics, plastics, and elastomers. The conductive material can be deposited onto the plastic or deposited into a carrier which is then inserted into the mold to form sensor 24.

As indicated above, the strips of sensor 24, which are electrically interconnected to one another, form a conductor which functions like a first conductive plate of a capacitor. Such a capacitor has a second conductive plate with the plates being separated from one another by a material such as a dielectric element. Unlike such a capacitor, sensor 24 is constructed without a second conductive plate and without a second conductive plate electrically connected to ground. Instead, the metal construction of lift gate 12 functions as the second conductive plate and provides shielding of sensor 24 from stray capacitive influence.

Alternatively, sensor 24 can be constructed to use multiple layers of conductors, each separated by a non-conductive material. A ground layer of conductive material placed behind the other layers can be used to provide extra shielding as necessary.

Fascia panel 22 made of a rigid material restricts sensor 24 from detecting electrically non-conductive objects. This is because the rigidness of fascia panel 22 prevents fascia panel 22 from displacing when an object touches fascia panel 22. In turn, sensor 24 is prevented from displacing toward the metal construction of lift gate 12 when the object touches fascia panel 22. As such, any change of the capacitance between sensor 24 and lift gate 12 does not occur as a result of an electrically non-conductive object touching fascia panel 22. For both electrically conductive and non-conductive object modes of detection, sensor 24 may be mounted to the external surface of fascia panel 22. In this case, an object (electrically conductive or non-conductive) touching sensor 24 triggers sensor 24 (i.e., causes a change in capacitance between sensor 24 and the metal construction of lift gate 12) due to sensor 24 compressing (i.e., sensor 24 displacing towards lift gate 12). Likewise, sensor 24 mounted to the internal surface of fascia panel 22 can detect an object touching fascia panel 22 when fascia panel 22 is flexible and/or compressible to the degree required to allow sensor 24 to displace towards lift gate 12.

Figure 4A:
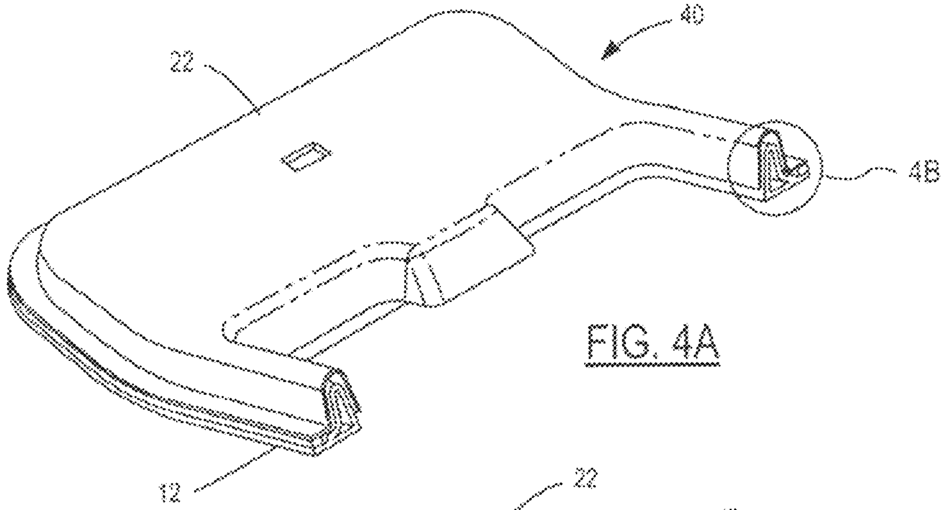
FIG. 4A illustrates a perspective view of a vehicle lift gate assembly having a lift gate and a fascia panel thereon with the fascia panel having a capacitance sensor in accordance with an embodiment of the present invention.
Figure 4B:
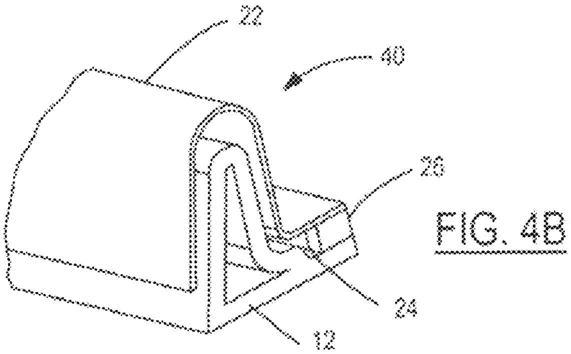
FIG. 4B illustrates the cross-section "4B" of FIG. 4A where the sensor is configured for both electrically conductive and non-conductive object detection.

Referring now to FIGS. 4A and 4B, a vehicle lift gate assembly 40 in accordance with an embodiment of the present invention is shown. Lift gate assembly 40 is similar to lift gate assembly 20 in that lift gate assembly 40 includes a lift gate 12 and a fascia panel 22 thereon with fascia panel 22 having sensor 24. Lift gate assembly 40 is configured differently than lift gate assembly 20 in that a portion of fascia panel 22 of lift gate assembly 40 is configured to enable sensor 24 to perform both electrically conductive and non-conductive object detection near this portion of fascia panel 22. Sensor 24 as shown in FIG. 4B can be separate from the trim panel.

To this end, an element (e.g., a strip) of sensor 24 is positioned on the interior surface of an edge region of fascia panel 22 adjacently along an edge of lift gate 12 and is separated from lift gate 12 by a spacer 26. Spacer 26 is constructed of an electrically non-conductive material and is compressible. As described above, the metal construction of lift gate 12 provides the electrical ground used to shield sensor 24 from stray capacitive influence. This configuration is an example of extending fascia panel 22 to the extreme edges of lift gate 12 to sense the presence of an object in the travel path of lift gate 12 when lift gate 12 closes. Spacer 26 made of a compressible material such as open or closed cell foam rubber or other like materials allows the edge region of sensor 24 (and the edge region of fascia panel 22) to move spatially closer to the metal ground of lift gate 12 upon an object touching the edge region of fascia panel 22. Spacer 26 can be continuous or comprised of smaller sections arranged along the area to be sensed which allows movement of the edge regions of fascia panel 22 and sensor 24 when pressure is applied.

Sensor 24 can detect electrically conductive objects which are in proximity to or touching the edge region of sensor 24 and can detect electrically non-conductive objects which are touching the edge region of sensor 24. In particular, sensor 24 can detect an electrically conductive object proximal to the edge region of sensor 24 due to the capacitive coupling of the edge region of sensor 24 with the object. Sensor 24 can detect an object (electrically conductive or non-conductive) touching the edge region of fascia panel due to the capacitance of sensor 24 with the metal construction of lift gate 12 changing as a result of the edge region of sensor 24 being displaced from the touch in the direction of lift gate 12. Spacer 26 compresses to allow the edge region of sensor 24 to displace towards lift gate 12.

Applications of sensor 24 are not limited to fascia panel 22 of lift gate assemblies 20, 40. Likewise, in addition to detecting the presence of an object for anti-entrapment purposes, sensor 24 can be positioned behind any electrically non-conductive surface and be configured to detect the presence, position, or motion (e.g., gesture) of an electrically conductive object such as a human. Sensor 24 and its controller can serve as an interface between a human user and a vehicle to enable the user to control various vehicle functions requiring human input. The controller can be configured to have sensitivity to detect the position of a person's finger in proximity to sensor 24 prior to carrying out an actual key press or other type of user activation. For example, it may be desired to initiate a sequence of operations by positioning a finger or hand in proximity to a series of sensors 24 ("touch pads") followed by a specific activation command once a sought out function has been located. The initial finger positioning can be to illuminate keypads or the like associated with the series of sensors 24 to a first intensity without activation of a command. As the touch area expands from increased finger pressure, the signal increases thereby allowing the controller to distinguish between positioning and activation command functions. Confirmation of the selection, other than activation of the desired function, can be configured to increase illumination intensity, audible feedback, or tactile feedback such as vibration. Each sensor 24 ("touch area") can have a different audio and feel to differentiate the touch area operation.

Figure 5:
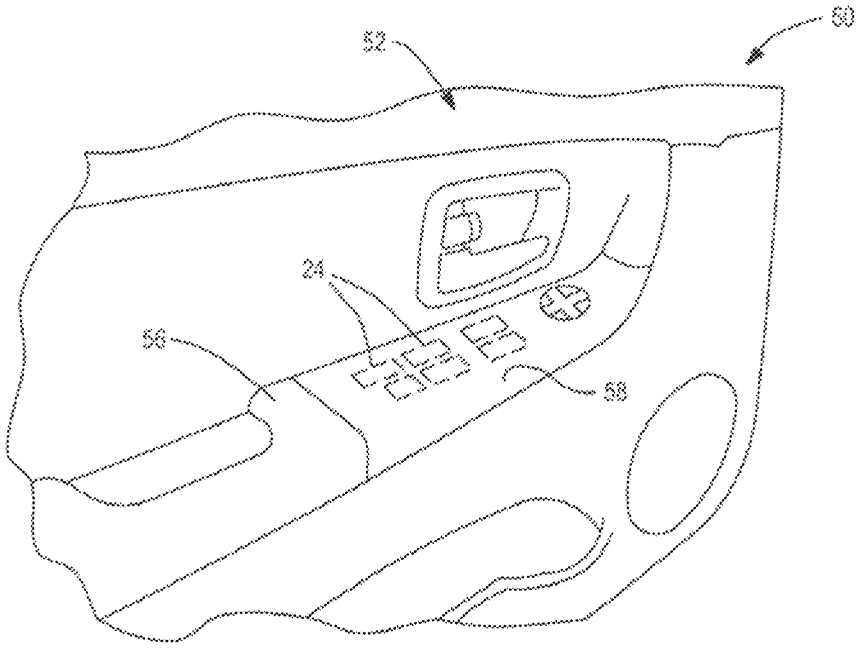
FIG. 5 illustrates a perspective view of a vehicle door assembly having an interior door fascia and capacitance sensors in accordance with an embodiment of the present invention.
Figure 6:
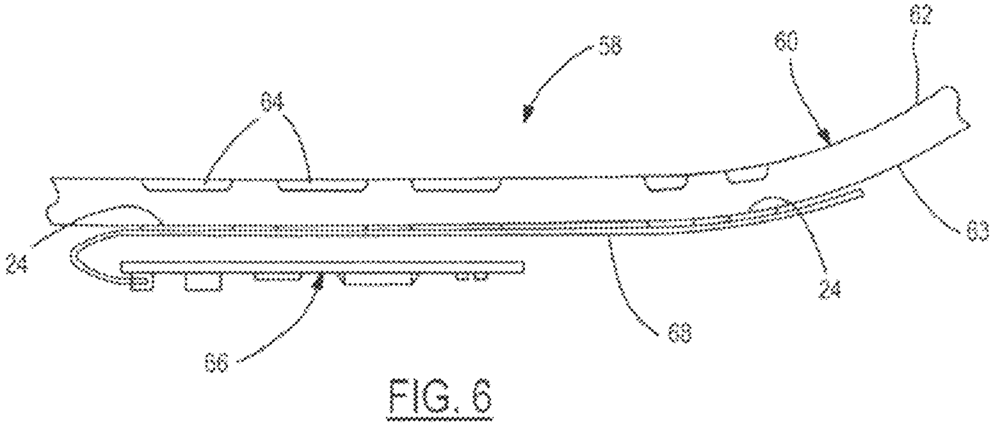
FIG. 6 illustrates a cross-sectional view of the arrangement of the sensors of the vehicle door assembly shown in FIG. 5.

Referring now to FIGS. 5 and 6, a vehicle door assembly 50 in accordance with an embodiment of the present invention will be described. Vehicle door assembly 50 represents an application of sensor 24 to an environment other than vehicle lift gate assemblies. Assembly 50 includes an interior door fascia 52 and a series of sensors 24. FIG. 5 illustrates a perspective view of vehicle door assembly 50 and FIG. 6 illustrates a cross-sectional view of the arrangement of sensors 24.

Sensors 24 of vehicle door assembly 50 are each formed by their own conductor and are not directly electrically connected to one another. As such, each sensor 24 defines a unique touch pad associated with a unique touch area in which object detection of one sensor 24 does not depend on object detection of another sensor 24. Sensors 24 are arranged into an array and function independently of one another like an array of mechanical switches that commonly control vehicle functions like window up and down travel, door locking and unlocking, positioning of side view mirrors, etc.

Interior door fascia 52 includes a pull handle 56 and a faceplate assembly 58 which together create an armrest component of door fascia 52. Sensors 24 are individually attached to the underside of faceplate assembly 58. Each sensor 24 has a sufficient area to detect a human finger proximal to that sensor. Object detection by a sensor 24 occurs when a portion of a user's body such as a hand or finger comes within sensitivity range directly over that sensor 24. By locating multiple sensors 24 on the underside of faceplate assembly 58, a sensor array is created to resemble the array of mechanical switches. Sensors 24 can be configured to have many different kinds of shapes such as raised surfaces or recessed contours to prevent accidental activation. Adding faceplate assembly 58 to the reversing control of a power window reduces complexity and cost associated with mechanical switches and associated wiring. The power window control for up/down can be incorporated into faceplate assembly 58 or the control can be remote if required due to vehicle design and packaging.

Referring briefly back to FIG. 2, a second sensor **24*a* placed on the external surface of the hatch (i.e., lift gate 12) of the vehicle can be used as an interface to operate the hatch. Additionally, a single controller can be used to interface with both anti-entrapment sensor 24 and hatch operating sensor 24*a***.

Referring back to FIGS. 5 and 6, faceplate assembly 58 includes a faceplate 60 made of electrically non-conductive material. Faceplate 60 provides support for multiple sensors 24 mounted to its underside (i.e., underside faceplate surface 63) and allows for object detection through its topside (i.e., topside faceplate surface 62). Underside faceplate surface 63 is relatively smooth to permit close mounting of sensors 24 to faceplate 60. However, degrees of roughness can also be configured to function effectively. Topside faceplate surface 62 can have any number of physical features 64 or graphical markings which are respectively associated (e.g., aligned) with sensors 24 in order to assist a user in locating the position of each sensor 24 and identifying the function assigned therewith.

Each sensor 24 is formed as a thin electrically conductive pad mounted firmly to underside faceplate surface 63. Each sensor 24 in this configuration is pliable and can therefore be formed to the contours of the surface of faceplate 60 to which the sensor is attached. An adhesive may be applied between sensors 24 and the surface of faceplate 60 for positioning and support as well as minimizing air gaps between sensors 24 and the faceplate surface. Alternatively, sensors 24 can be molded into faceplate 60 thereby eliminating the need for adhesive or other mechanical attachment. Another alternate is each sensor 24 being arranged as a member mounted directly on a printed circuit board (PCB) 66 (i.e., a controller) and extending up toward, and possibly contacting, underside faceplate surface 63. With this arrangement, sensors 24 can be in direct physical and electrical contact with PCB 66 or in indirect contact with PCB 66 through the use of a joining conductor.

Each sensor 24 can be constructed of an electrically conductive material such as foam, metal, conductive plastic, or a non-conductive element with a conductive coating applied thereon. Materials used to construct sensors 24 should be of a compressible nature to account for tolerance stack-ups that are a normal part of any assembly having more than one component. Sensor compressibility ensures that contact is maintained between faceplate 60 and PCB 66. In the event that faceplate 60 is to be backlit, the use of a light pipe with conductive coating applied could be configured as a sensor 24.

Sensors 24 can be constructed from materials having low electrical resistance such as common metals like copper or aluminum. Other materials exhibiting low electrical resistance such as conductive plastics, epoxies, paints, inks, or metallic coatings can be used. Sensors 24 can be preformed to resemble decals, emblems, stickers, tags, and the like. Sensors 24 can be applied onto surfaces as coatings or etched from plated surfaces. If materials are delicate, then a non-conductive backing 68 such as polyester film, fiberglass, paper, rubber, or the like can support and protect sensors 24 during installation. In applications where multiple sensing areas are required, backing 68 can assist in locating and anchoring sensors 24 to faceplate 60.

Figure 7A:
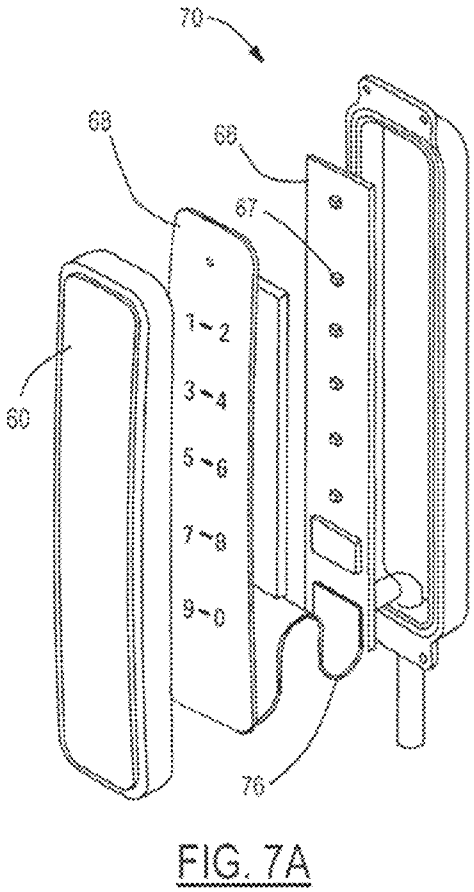
FIGS. 7A through 7D illustrate various views of a vehicle keyless entry assembly in accordance with an embodiment of the present invention.
Figure 7B:
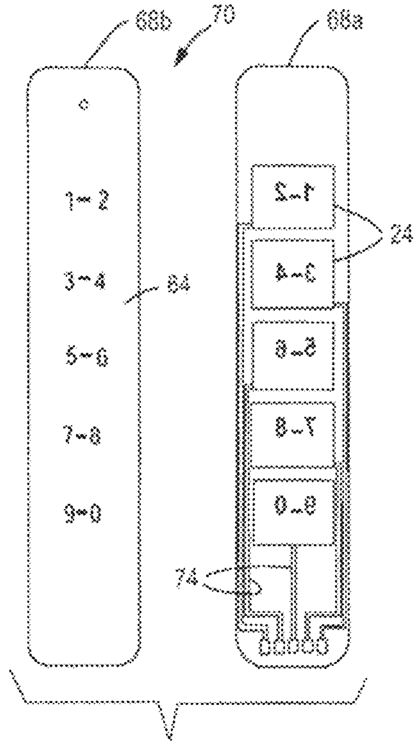
Figure 7C:
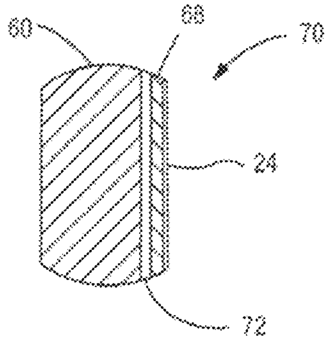
Figure 7D:
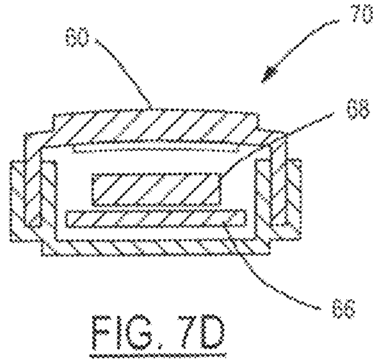

With reference to FIG. 6, backing 68 is a flexible circuit having copper pads which make up the touch pads of sensors 24 (i.e., each sensor 24 includes a copper pad). Backing 68 includes separated copper wires electrically connected to respective sensors 24 (shown in FIG. 7B). Backing 68 makes an electrical connection to PCB 66 such that each sensor 24 is electrically connected to the signal conditioning electronics of PCB 66. In an alternate configuration, backing 68 and PCB 66 are combined into a single circuit board containing both the touch pads of sensors 24 and the signal conditioning electronics.

In order to activate a sensor 24, a user applies a finger to the associated marking 64 on the surface of faceplate 60. Electronic signal conditioning circuitry of PCB 66 which is interfaced to sensor 24 then processes the input signal from sensor 24 and completes circuit connections to activate the commanded function. The action is similar to pressing a mechanical switch to complete an electrical circuit.

Placement of sensors 24 behind a non-conductive barrier such as faceplate 60 creates a protective barrier between users and sensors 24 and shields sensors 24 against environmental contaminants. Sensors 24 can be applied to the backside of virtually any non-conductive barrier and preferably are flexible enough to conform to complex geometries where operator switch functions are needed. Sensors 24 can be contoured and configured from more rigid materials if desired. Examples of switch locations in a vehicle are door panels, armrests, dashboards, center consoles, overhead consoles, internal trim panels, exterior door components, and the like. Sensors 24 can be arranged individually or grouped as keypad arrays. Sensors 24 can be arranged into patterns of sequential sensing elements which are either electrically discrete or interconnected to create ergonomically appealing interfaces.

Referring now to FIGS. 7A through 7D, with continual reference to FIGS. 5 and 6, various views of a vehicle keyless entry assembly 70 in accordance with an embodiment of the present invention are shown. Vehicle keyless entry assembly 70 represents an example of an automotive application incorporating sensors 24. Sensors 24 of vehicle keyless entry assembly 70 function as touch pads to activate a vehicle keyless entry. In addition to sensors 24, vehicle keyless entry assembly 70 includes a faceplate 60, a backing 68, and a PCB 66 (i.e., a controller). Sensors 24 with backing 68 are configured as a flexible circuit which uses individual conductive coatings for the touch pads of sensors 24. Backing 68 makes respective electrical connections between sensors 24 and the signal conditioning electronics on PCB 66. Vehicle keyless entry assembly 70 represents an example of a product requiring backlighting. As such, sensors 24 have to be capable of passing light. Accordingly, faceplate 60 in this configuration is a molded transparent or translucent non-conductive material such as GE Plastics Lexan® 141 grade polycarbonate. Further, PCB 66 has light sources 67 for illumination. Light sources 67 are positioned on respective portions of PCB 66 to be adjacent to corresponding ones of sensors 24. Other resins or materials meeting the application requirements including acceptable light transmittance characteristics can also be used for faceplate 60. Sensors 24 are attached to the underside 68*a* of backing 68. In turn, the topside 68*b* of backing 68 is attached to the interior surface of faceplate 60 using adhesive 72. The topside 68*b* of backing 68 has graphic characters 64 that locate the position of associated sensors 24 and identify the function assigned therewith. Either the underside 68*a* or the topside 68*b* of backing 68 has individual traces 74 for making an electrical connection between sensors 24 and PCB 66. Connection between backing 68 and PCB 66 is connected by a flat cable 76 which contains traces 74. This interconnect can be accomplished using other carriers such as individual wires, header style connectors, and the like. In any of the configurations, sensors 24 can be applied directly to the surface which is to be touched for activation. However, sensors 24 are on the backside of the touch surface for protection and wear resistance.

Each sensor 24 of vehicle keyless entry assembly 70 may be made from Indium Tin Oxide (ITO) which is optically transparent and electrically conductive with an electrical resistance measuring sixty ohms/sq. Other electrically conductive materials such as foam, elastomer, plastic, or a nonconductive structure with a conductive coating applied thereon can be used to produce a sensor 24 having transparent or translucent properties and being electrically conductive. Conductive materials that are opaque such as metal, plastic, foam, elastomer, carbon inks, or other coatings can be hollowed to pass light where desired while the remaining perimeter of material acts as sensor 24. The touch pads of the sensors 24 can be made from copper using standard printed circuit board (PCB) manufacturing techniques, as well as silvered ink using a standard process such as screen printing.

An optically transparent and an electrically conductive sensor 24 made from ITO may create a color shift as light travels through the sensor and through the faceplate to which the sensor is attached. This color shift is a result of the optical quality and reflection of the optical distance between the front ITO surface of the sensor and the rear ITO surface of the sensor. In order to eliminate the light transmission errors between the different ITO layers, a transparent coating is applied on the rear ITO surface to initially bend the light which thereby eliminates the color differential seen on the front surface of the sensor between the front and rear ITO surfaces of the sensor. Additionally, an acrylic coating may be applied on the sensor to provide a layer of protection and durability for exposed ITO.

Turning back to FIG. 2, with continual reference to the other figures, as described above, a second sensor 24*a* placed on the external surface of a vehicle opening such as a hatch (i.e., lift gate 12) can be used as an interface to operate the vehicle opening. In accordance with an embodiment of the present invention, a keyless entry assembly includes a sensor like any of sensors 24 described herein which is to be placed on the external surface of a vehicle opening and is to be used as an interface to operate (i.e., open and close; unlock and lock) the vehicle opening. As an alternative to being a hatch, the vehicle opening may be a door, a trunk lid, or any other opening of a vehicle and may be of a metal construction. The discussion below will assume that the vehicle opening is a trunk lid and that this keyless entry assembly includes a sensor 24 which is placed on the external side of the trunk lid and arranged behind a non-conductive barrier like faceplate 60.

This keyless entry assembly further includes a controller in addition to sensor 24. The controller is operable to unlock the trunk lid. The controller is in communication with sensor 24 to monitor the capacitance of sensor 24 in order to determine whether an object (including a human user) is touching sensor 24 or whether an electrically conductive object (such as the user) is in proximity to sensor 24. If the controller determines that a user is touching or is in proximity to sensor 24, then the controller deduces that the user is at least in proximity to the trunk lid. Upon deducing that a user is at least in proximity to the trunk lid, the controller controls the trunk lid accordingly. For instance, while the trunk lid is closed and a user touches or comes into proximity to the trunk lid, the controller unlocks the trunk lid. In turn, the user can open the trunk lid (or the trunk lid can be opened automatically) to access the trunk.

As such, this keyless entry assembly can be realized by touch or touchless activation for releasing the trunk lid. An example of touch activation is a user touching sensor 24. An example of touchless activation is a user moving into proximity to sensor 24. As will be described in greater detail below with reference to FIGS. 8A and 8B, another example of touchless activation is a sequence of events taking place such as a user approaching sensor 24 and then stepping away in a certain amount of time.

In either touch or touchless activation, this keyless entry assembly may include a mechanism for detecting the authorization of the user to activate the trunk lid. To this end, the controller is operable for key fob querying and the user is to possess a key fob in order for the controller to determine the authorization of the user in a manner known by those of ordinary skill in the art. That is, the user is to be in at least proximity to the trunk lid and be in possession of an authorized key fob (i.e., the user has to have proper identification) before touch or touchless activation is provided.

For instance, in operation, a user having a key fob approaches a trunk lid on which sensor 24 is placed. The user then touches or comes into proximity to sensor 24. In turn, the controller determines that an object is touching or is in proximity to the trunk lid based on the resulting capacitance of sensor 24. The controller then transmits a key fob query to which the key fob responds. If the response is what the controller expected (i.e., the key fob is an authorized key fob), then the controller unlocks the trunk lid for the user to gain access to the trunk. On the other hand, if there is no response or if the response is not what the controller expected (i.e., the key fob is an unauthorized key fob), then the controller maintains locking of the trunk lid.

Figure 8A:
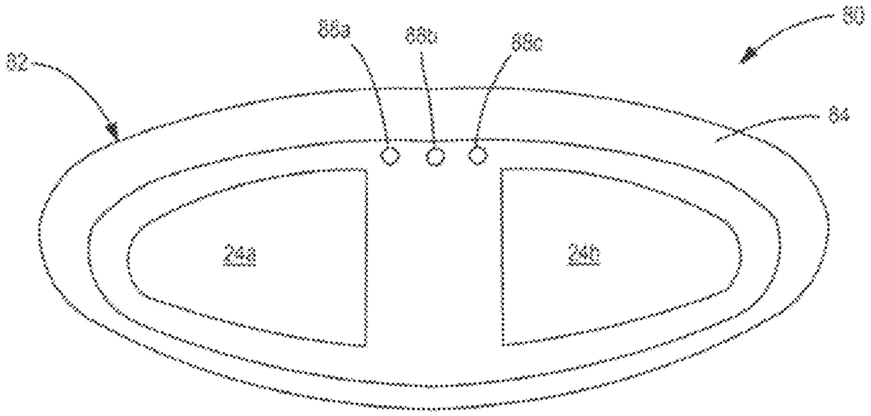
FIGS. 8A and 8B illustrate various views of a vehicle keyless entry assembly in accordance with an embodiment of the present invention.
Figure 8B:
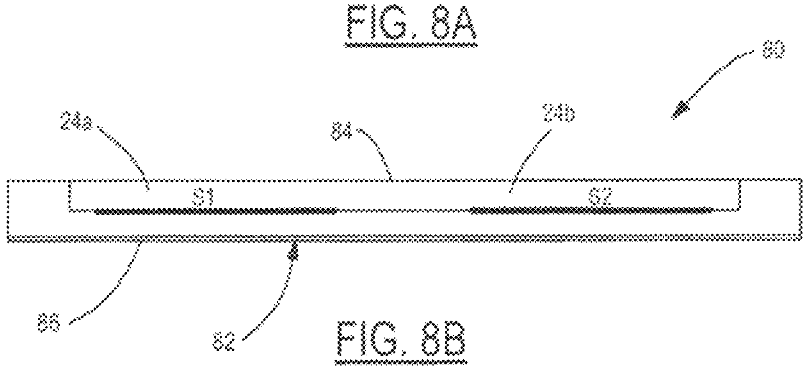

Another feature of this keyless entry assembly, described in greater detail below with reference to FIGS. 8A and 8B, is that sensor 24 may be in the form of an emblem, decal, logo, or the like (e.g., "emblem") in a manner as described herein. Such an emblem (i.e., sensor 24) may represent or identify the vehicle to which sensor 24 is associated. As such, emblem 24 may have different structures, forms, and characteristics depending on manufacturer and model of the vehicle.

Further, sensor 24 of this keyless entry assembly may be capable of passing light in a manner as described herein. Accordingly, this keyless entry assembly may further include a light source, such as any of light sources 67, which is associated with sensor 24. In this event, the controller is operable for controlling the light source in order to illuminate sensor 24 (i.e., illuminate the emblem).

With the above description of this keyless entry assembly in mind, FIGS. 8A and 8B illustrate various views of such a keyless entry assembly 80 in accordance with an embodiment of the present invention.

Keyless entry assembly 80 includes a sensor assembly 82 and a controller (not shown). The controller is in communication with sensor assembly 82 and is operable for controlling vehicle functions such as locking and unlocking a vehicle opening (e.g., a trunk lid of a vehicle). FIG. 8A is a view looking at sensor assembly 82 while sensor assembly 82 is placed on the external surface of the trunk lid. FIG. 8B is a view looking through a cross-section of sensor assembly 82. Sensor assembly 82 includes two sensors (i.e., first sensor 24*a* and second sensor 24*b*). First sensor 24*a* is labeled in FIG. 8B as "S1" and second sensor 24*b* is labeled in FIG. 8B as "S2". Sensors 24*a*, 24*b* are respectively located at different portions of sensor assembly 82. For instance, as shown in FIGS. 8A and 8B, first sensor 24*a* is at a left-hand side of sensor assembly 82 and second sensor 24*b* is at a right-hand side of sensor assembly 82.

Sensors 24*a*, 24*b* are electrically connected to or associated with a PCB in a manner as described herein. As such, sensors 24*a*, 24*b* are not electrically connected to one another. First sensor 24*a* activates when an object is in proximity to first sensor 24*a* and second sensor 24*b* activates when an object is in proximity to second sensor 24*b*. Similarly, only first sensor 24*a* activates when an object is in proximity to first sensor 24*a* and not to second sensor 24*b*. Likewise, only second sensor 24*b* activates when an object is in proximity to second sensor 24*b* and not to first sensor 24*a*. The activation of a sensor like sensors 24*a*, 24*b* depends on the capacitance of the sensor as a result of an object coming into at least proximity with the sensor. For instance, when an object is in proximity to both sensors 24*a*, 24*b* and is closer to first sensor 24*a* than to second sensor 24*b*, then first sensor 24*a* will have a stronger activation than second sensor 24*b*.

Sensor assembly 82 further includes a non-conductive barrier 84 like faceplate 60. Sensors 24*a*, 24*b* are mounted to the underside of faceplate 84. Faceplate 84 allows for object detection through its topside. Sensor assembly 82 further includes an overlay 86 positioned over faceplate 84. Overlay 86 is in the shape of an emblem or logo representing the vehicle. In this example, overlay 86 includes two cut-out portions at which sensors 24*a*, 24*b* are respectively located. As such, sensors 24*a*, 24*b* are patterned to conform to the emblem arrangement of overlay 86.

Keyless entry assembly 80 is an example of the use of sensors (i.e., sensor assembly 82) in conjunction with a controller for operating a trunk lid when a user is in proximity to or is touching sensor assembly 82. As described herein, the operation of the trunk lid may further depend on the authenticity of the user (i.e., whether the user is in possession of an authorized key fob). In the manner described above, sensor assembly 82 can be used to realize either touch or touchless activation for releasing the trunk lid. In terms of touchless activation, sensor assembly 82 represents an example of a hands-free virtual proximity switch.

A particular application of sensor assembly 82 realizing touchless activation involves a sequence of user events taking place relative to sensor assembly 82 in order to control operation of the trunk lid. For instance, the controller of keyless entry assembly 80 may be configured such that a user is required to approach sensor assembly 82 and then step back from sensor assembly 82 in a certain amount of time in order for the controller to unlock the trunk lid. Such a sequence of user events is effectively user body gestures. As such, an expected sequence of user body gestures effectively represents a virtual code for unlocking the trunk lid. That is, the controller unlocks the trunk lid in response to a user performing an expected sequence of body gestures in relation to sensor assembly 82. The user may or may not be required to have an authorized key fob depending on whether possession of an authorized key fob is required to unlock the trunk lid.

A more elaborate example of an expected sequence of user body gestures includes the user starting in proximity to sensor assembly 82, then moving backward, then moving left, then moving right, etc. For understanding, another example of an expected sequence of user body gestures includes the user starting in proximity to sensor assembly 82, then moving away, then moving close, etc. The steps of either sequence may be required to occur within respective time periods. As can be seen, different expected sequences of user body gestures effectively represent different virtual codes for controlling the trunk lid.

Keyless entry assembly 80 provides the user the opportunity to 'personalize' sensor assembly 82 in order to program the controller with the expected sequence of user body gestures that are to be required to control the trunk lid. Personalizing sensor assembly 82 with an expected sequence of user body gestures effectively provides a virtual code to the controller which is to be subsequently entered by the user (by subsequently performing the expected sequence of user body gestures) for the controller to unlock the trunk lid.

The requirement of a sequence of user body gestures, i.e., user body gestures in a certain pattern in a certain amount of time, to take place in order to control operation of the trunk lid is enabled as sensors 24*a*, 24*b* activate differently from one another as a function of the proximity of the user to that particular sensor. Again, each sensor 24*a*, 24*b* activates when a user is in proximity to that sensor and each sensor 24*a*, 24*b* is not activated when a user in not in proximity to that sensor. In the former case, sensors 24*a*, 24*b* activate when a user is in proximity to sensors 24*a*, 24*b* (which happens when a user steps into proximity of both sensors 24*a*, 24*b*). In the latter case, sensors 24*a*, 24*b* are not activated when the user is out of proximity to sensors 24*a*, 24*b* (which happens when a user steps back far enough away from sensors 24*a*, 24*b*).

As further noted above, the amount of activation of a sensor such as sensors 24*a*, 24*b* depends on the proximity of a user to the sensor. For instance, first sensor 24*a* has a stronger activation than second sensor 24*b* when the user is in closer proximity to first sensor 24*a* than to second sensor 24*b*. As such, in this event, the controller determines that the user is closer to first sensor 24*a* than to second sensor 24*b*. That is, the controller determines that the user has stepped to the left after the user initially was initially in proximity to sensor assembly 82. Likewise, second sensor 24*b* has a stronger activation than first sensor 24*a* when the user is in closer proximity to second sensor 24*b* than to first sensor 24*a*. As such, in this event, the controller determines that the user is closer to second sensor 24*b* than to first sensor 24*a*.

That is, the controller determines that the user has stepped to the right after the user initially was in proximity to sensor assembly 82.

In order to improve this particular application of touchless activation which involves an expected sequence of user body gestures to take place, sensor assembly 82 further includes a plurality of light sources 88 such as light-emitting diodes (LEDs). For instance, as shown in FIG. 8A, sensor assembly 82 includes a first LED 88*a*, a second LED 88*b*, and a third LED 88*c*. LEDs 88 are electrically connected to the PCB to which sensors 24*a*, 24*b* are electrically connected. LEDs 88 are mounted to the underside of faceplate 84 where overlay 86 is absent or, alternatively, LEDs 88 are mounted to the underside of faceplate 84 where overlay is present (as shown in FIG. 8A). In either case, faceplate 84 is clear such that light from LEDs 88 can pass through faceplate 84. In the latter case, overlay 86 has cutouts dimensioned to the size of LEDs 88 and LEDs 88 are respectively positioned adjacent to these cutouts such that light from LEDs 88 can pass through faceplate 84 and overlay 86.

The controller is configured to control LEDs 88 to light on or off depending on activation of sensors 24*a*, 24*b*. In general, the controller controls LEDs 88 such that: LEDs 88*a*, 88*b*, 88*c* light on when both sensors 24*a*, 24*b* are activated; LEDs 88*a*, 88*b*, 88*c* light off when both sensors 24*a*, 24*b* are not activated; first LED 88*a* lights on when first sensor 24*a* is activated and lights off when first sensor 24*a* is not activated; and third LED 88*c* lights on when second sensor 24*b* is activated and lights off when second sensor 24*b* is not activated. More specifically, the controller controls LEDs such that: LEDs 88*a*, 88*b*, 88*c* light on when a user is in proximity to both sensors 24*a*, 24*b* (which occurs when the user steps close to sensor assembly 82) 24*b*); LEDs 88*a*, 88*b*, 88*c* light off when the user is out of proximity to both sensors 24*a*, 24*b* (which occurs when the user steps far enough back away from sensor assembly 82); first LED 88*a* lights on and second and third LEDs 88*b*, 88*c* light off when the user is in proximity to first sensor 24*a* and is no closer than tangential proximity to second sensor 24*b* (which occurs when the user steps to the left while in proximity to sensor assembly 82); and third LED 88*c* lights on and first and second LEDs 88*a*, 88*b* light off when the user is in proximity to second sensor 24*b* and is no closer than tangential proximity to first sensor 24*a* (which occurs when the user steps to the right while in proximity to sensor assembly 82).

Accordingly, the user can use the lighting of LEDs 88*a*, 88*b*, 88*c* as feedback when performing a sequence of user body gestures relative to sensor assembly 82 in order to either program (personalize) sensor assembly 82 with the sequence of user body gestures or to unlock the trunk lid by performing the sequence of user body gestures.

Referring now to FIG. 9, with continual reference to FIGS. 5 and 6 and FIGS. 7A through 7D, a vehicle keyless entry assembly 90 in accordance with another embodiment of the present invention is shown. Keyless entry assembly 90 is for use with a user accessible vehicle part such as a window, door handle, etc. As an example, the user accessible vehicle part will be illustrated as a vehicle window 92.

Keyless entry assembly 90 includes a sensor assembly 94. Sensor assembly 94 includes sensors 24. In this example, sensor assembly 94 includes five sensors 24 just like vehicle keyless entry assembly 70 shown in FIGS. 7A through 7D. Sensors 24 are electrically isolated from one another and function as touch pads to activate a keyless entry function as generally described herein and as described with reference to FIGS. 7A through 7D.

Sensor assembly 94 further includes an electrically non-conductive carrier 96 such as a plastic film. Sensors 24 are applied to a surface of carrier 96. As indicated by the dotted lines in FIG. 9, sensors 24 are applied to the rear surface of carrier 96 as the front surface of the carrier is to be applied to window 92. (As an alternate embodiment, sensors 24 are applied to the front surface of carrier 96.) Carrier 96 includes electrically isolated metal wires which are electrically connected to respective sensors 24. (The wires are not shown, but may be understood with reference to FIG. 7B.) The wires of carrier 96 make an electrical connection to a PCB or the like such that each sensor 24 is individually electrically connected to the PCB.

In one embodiment, sensors 24 are made from Indium Tin Oxide (ITO). ITO is useful as it has the appropriate electrical properties for sensing functions as described herein and has appropriate optical properties for applications requiring illumination. In the case of sensors 24 being made from ITO, the sensors may be applied directly to the glass of window 92 instead of to carrier 96. Likewise, ITO sensors 24 may be applied directly to the mirror, plastic, etc., forming the corresponding user accessible vehicle part.

As noted, ITO sensors 24 are appropriate for applications requiring illumination. In furtherance of this objective, keyless entry assembly 90 further includes a light pipe assembly 98 to be used for illumination. FIG. 10 illustrates an enlarged view of light pipe assembly 98. Light pipe assembly 98 includes a body portion 100 and a button indicator 102. Body portion 100 may be in the form of plastic, glass, mirror, or other medium capable of conducting light. In one embodiment, body portion 100 is in the form of a film that is capable of conducting light. Button indicator 102 is directly built into the plastic, glass, mirror, etc. making up body portion 100. Button indicator 102 includes graphic markings that respectively correspond with sensors 24. The graphic markings of button indicator 102 locate the position of the associated sensors 24 and identify the functions assigned therewith. In the assembled stage of keyless entry assembly 90, light pipe assembly 98 is attached to the rear surface of carrier 96 and the front surface of the carrier is attached to window 92.

FIGS. 11A, 11B, and 11C respectively illustrate cross-sectional views of body portion 100 of light pipe assembly 98 according to three different variations. In the first variation, body portion 100 has a uniform thickness as shown in FIG. 11A. In the second variation, body portion 100 has a thickened light piping portion 104 where light is to be applied. In the third variation, body portion 100 has a different thickened light piping portion 106 where light is to be applied.

Uniform illumination of button indicator 102 of light pipe assembly 98 is an important aesthetic feature. With reference to FIG. 12, button indicator 102 may be etched, machined, or the like into body portion 100 of light pipe assembly 98 in order to be illuminated with light 108 from a light source. In order to obtain uniform lighting, button indicator 102 may be etched at an appropriate angle (e.g., etch depth angle 110). As a result of being etched at an appropriate angle, all areas of the markings of button indicator 102 are illuminated as the lower sections of the markings of button indicator 102 do not block light 108 from illuminating the upper sections of the markings of the button indicator. The etching may be done on the rear side of body portion 100 so that the attachment between light pipe assembly 98 and carrier 96 (such as via a liquid adhesive) does not affect the conductance of light 108.

Figure 13:
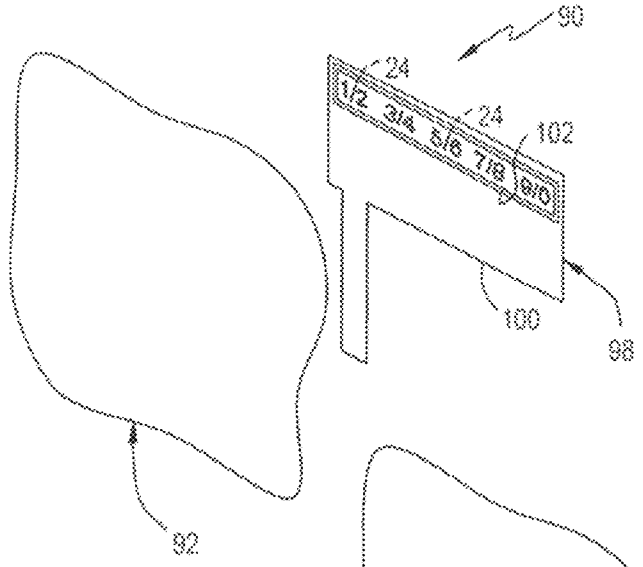
FIG. 13 illustrates a variation of the vehicle keyless entry assembly shown in FIG. 9.

FIG. 13 illustrates a variation of keyless entry assembly 90. In this variation, sensors 24 along with the corresponding electrical connections which are to connect with a PCB are combined with light pipe assembly 98 such that carrier 96 is eliminated. As indicated by the dotted lines in FIG. 13, sensors 24 are applied to the rear surface of body portion 100 of light pipe assembly 98 adjacent to button indicator 102 of light pipe assembly 98.

Figure 14:
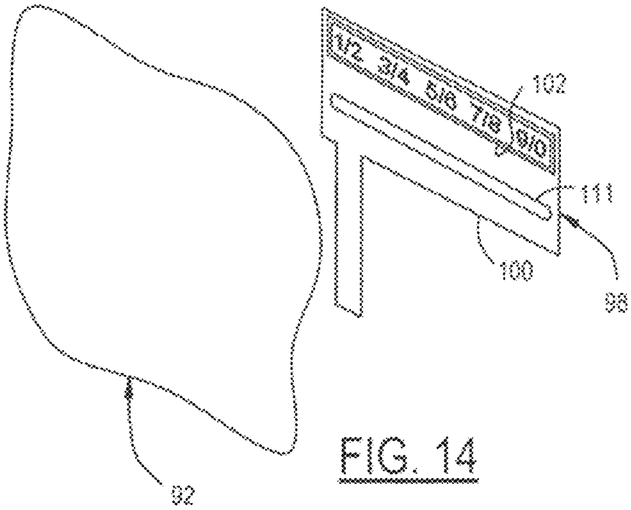
FIG. 14 illustrates another variation of the vehicle keyless entry assembly shown in FIG. 9.

The lighting of light pipe assembly 98 may occur at any point within body portion 100 that is useful such as through a slot 111 in the middle portion of body portion 100 as shown in FIG. 14.

Figure 15:
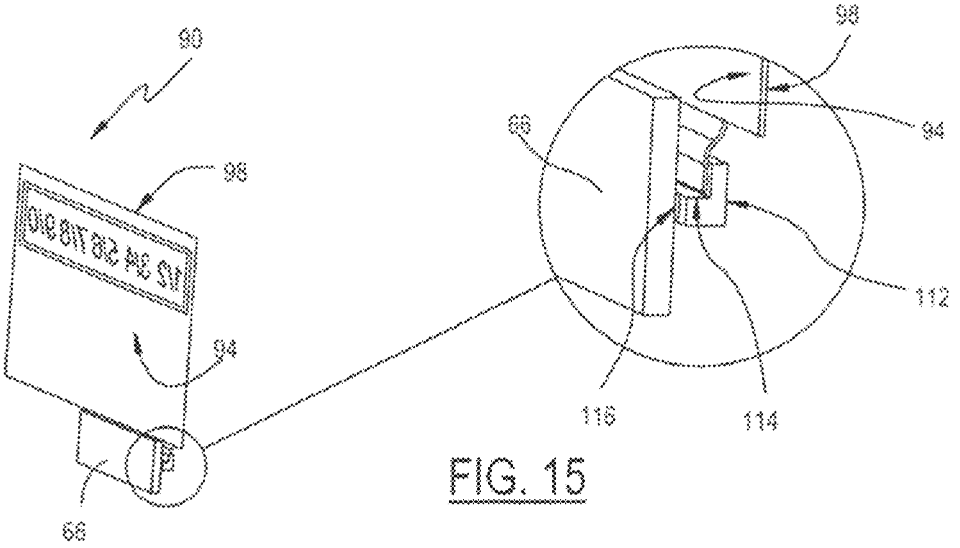
FIGS. 15 and 16 respectively illustrate two different exemplary ways for connecting the vehicle keyless entry assembly shown in FIG. 9 to a PCB.
Figure 16:
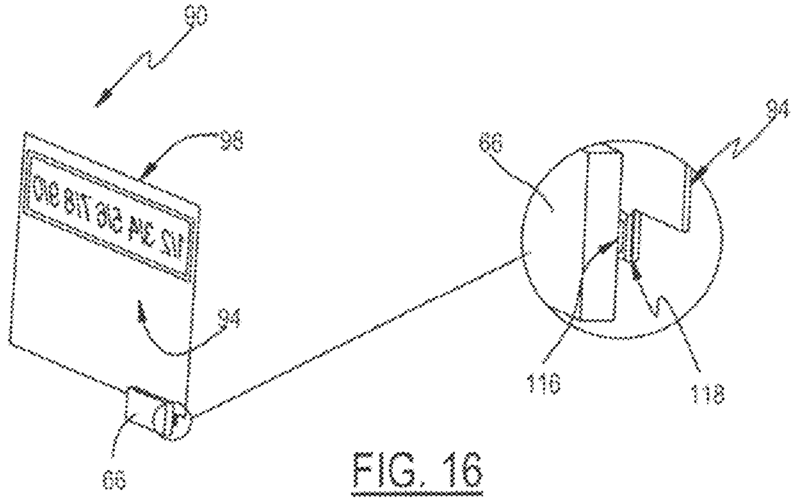

Referring now to FIGS. 15 and 16, with continual reference to FIG. 9, two different exemplary ways for connecting keyless entry assembly 90 to a PCB 66 will be described. Initially, it is noted that as indicated in FIGS. 15 and 16, sensor assembly 94 (comprised of sensors 24 and carrier 96) and light pipe assembly 98 are attached to one another to thereby form keyless entry assembly 90.

As shown in FIG. 15, a connection strip 112 has electrically conductive pads 114. Conductive pads 114 are to be respectively electrically connected with the corresponding metal conductors of carrier 96 of sensor assembly 94. Conductive pads 114 electrically connect sensor assembly 94 to PCB 66. In making such electrical connection between sensor assembly 94 and PCB 66, conductive pads 114 may be used in conjunction with an electrically conductive compressible material 116 or a mechanical connection shown in carrier 96 as a pigtail connection.

As shown in FIG. 16, an end portion 118 of sensor assembly 94 is folded back onto itself. The corresponding conductors of carrier 96 of sensor assembly 94 at folded end portion 118 electrically connect with PCB 66 in order to electrically connect sensor assembly 94 to the PCB. Again, in making such electrical connection between sensor assembly 94 and PCB 66, folded end portion 118 of sensor assembly 94 may be used in conjunction with an electrically conductive compressible material 116.

Figure 17:
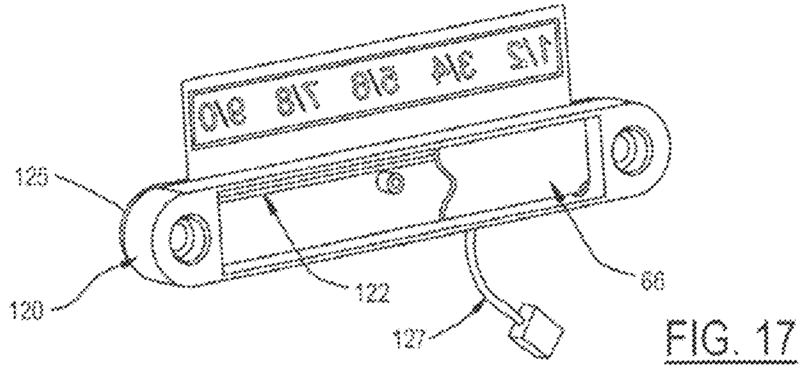
FIG. 17 illustrates an alternate variation of the light pipe assembly of the vehicle keyless entry assembly shown in FIG. 9.

FIG. 17 illustrates an alternate variation of film-type light pipe assembly 98. As shown, this variation entails replacing light pipe assembly 98 with a light pipe having an integrated housing 120. This enables a light pipe detail 122 to simplify the position and placement of illumination device(s), such as LED(s), on PCB 66. A seal 125 is provided to prevent fluid entrance into the electronics and between light pipe assembly 98 to housing 120 and/or between housing 120 and vehicle window 92.

Connection is made from window 92 by a harness 127. For windows 92 that are movable, a harness 127 is provided for attachment between the vehicle and the glass.

Figure 18:
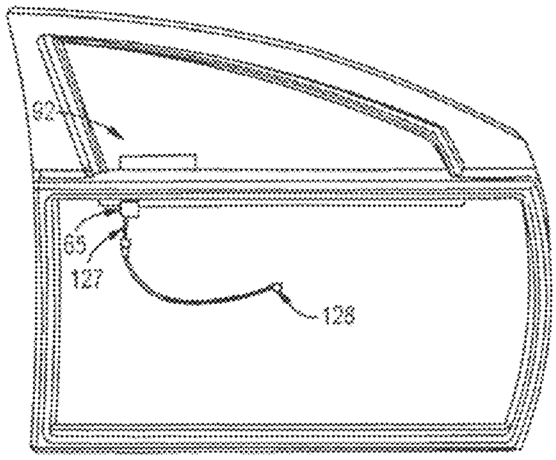
FIG. 18 illustrates connection of the alternative vehicle keyless entry assembly variation shown in FIG. 17 to a vehicle structure.

As shown in FIG. 18, a movable harness 127 is attached between electronic module 65 and door frame fasteners 128 which provide strength to prevent damage to the harness 127. The harness 127 can be made of a ribbon type or wire in a guide that is flexible for protecting the wire.

Figure 19:
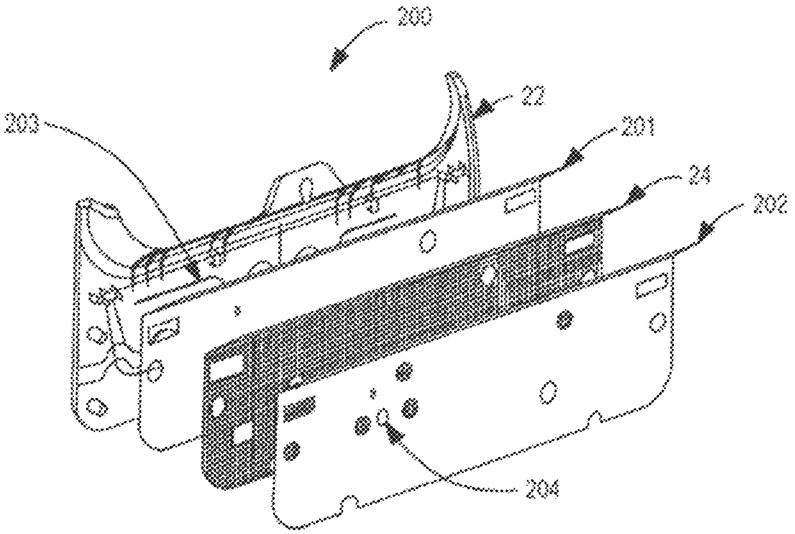
FIG. 19 illustrates an exploded view of a fascia panel assembly in accordance with another embodiment of the present invention.
Figure 20:
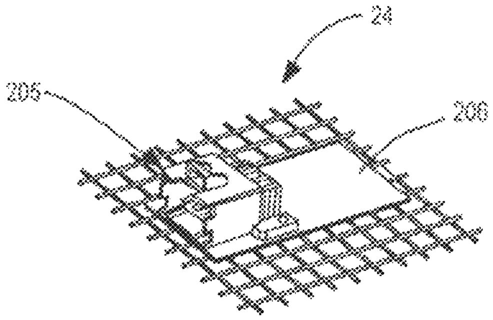
FIG. 20 illustrates a portion of the sensor of the fascia panel assembly shown in FIG. 19.

Referring now to FIGS. 19 and 20, with continual reference to FIGS. 2, 3A, and 3B, a fascia panel assembly 200 in accordance with another embodiment of the present invention will be described. FIG. 19 illustrates an exploded view of fascia panel assembly 200. Fascia panel assembly 200 includes a fascia panel 22, a sensor 24, and first and second non-electrically conductive isolators 201 and 202. FIG. 20 illustrates a portion of sensor 24 of fascia panel assembly 200.

As background, FIG. 2 illustrates a vehicle lift gate assembly 20 having a movable lift gate 12 that includes a fascia panel 22 having a sensor 24 associated therewith. FIGS. 3A and 3B illustrate interior views of fascia panel 22 and sensor 24. As shown in FIGS. 3A and 3B, sensor 24 is formed from an array of electrically conductive strips which are placed vertically and horizontally across the interior surface of fascia panel 22. The strips of sensor 24 are in electrical connectively to each other and together form the conductor of sensor 24 (i.e., as noted above, the strips together are sensor 24).

Fascia panel assembly 200 shown in FIG. 19 is an alternative to the fascia panel and sensor combination shown in FIGS. 3A and 3B. Fascia panel assembly 200 may be part of a movable lift of a vehicle lift gate assembly or may be associated with a totally different component.

As indicated in FIGS. 19 and 20, sensor 24 of fascia panel assembly 200 is formed from an array of vertically and horizontally extending electrically conductive strips. The strips of sensor 24 are in electrical connectively to each other and together form sensor 24. However, sensor 24 may have any of a number of forms. For instance, sensor 24 may be any conductive material that can be formed to fit behind fascia panel 22. Sensor 24 can be made of welded steel mesh.

As indicated in FIG. 19, first isolator 201 is positioned between fascia panel 22 and sensor 24 and sensor 24 is positioned between first and second isolators 201 and 202. As such, fascia panel 22 and sensor 24 sandwich first isolator 201 and isolators 201 and 202 sandwich sensor 24. To this end, isolators 201 and 202 isolate sensor 24 from fascia panel 22 as well as to isolate sensor 24 from vehicle interior features. Isolators 201 and 202 can be configured to provide sound attenuation at desired frequencies. Further, in the case of fascia panel 22 being flexible, first isolator 201 may also be flexible such that fascia panel 22 and first isolator 201 displace when an object is touching the fascia panel 22 and thereby cause sensor 24 to displace.

Sensor 24 may be adhesively bonded between isolators 201 and 202 for one piece assembly. Sensor 24 may be composed of a conductive fabric and attached to fascia panel 22 or either of isolators 201 and 202. Sensor 24 may be composed of conductive paint or conductive ink and applied to fascia panel 22 or either of isolators 201 and 202. Sensor 24 can be formed as one or more electrical conductors on a substrate such as metallization on a plastic film.

Second isolator 202 may be a thick foam and compressed between vehicle body panels and the combination of fascia panel 22, sensor 24, and first isolator 201 in order to hold sensor 24 and first isolator 201 in position.

As shown in FIG. 19, fascia panel 22 may include a stud 203. Stud 203 may be used in conjunction with corresponding holes or pockets of any one of first isolator 201, sensor 24, and second isolator 202 in order to position sensor 24. Similarly, stud 203 may be used to retain first isolator 201, sensor 24, and second isolator 202. To this end, the common manufacturing process known as heat-staking may be employed. Stud 203 may be used for a fastener for retention with the use of a hardware retention element 204 such as a speed nut, screw, bolt, nut, etc.

As indicated above, FIG. 20 illustrates a portion of sensor 24 of fascia panel assembly 200. This portion of sensor 24 includes a printed circuit board (i.e., a controller) 206 having a connector 205. As such, electrical connection to sensor 24 may be performed by selective soldering of relatively small PCB 206 with appropriate connector 205 as shown in FIG. 20.

Figure 21:
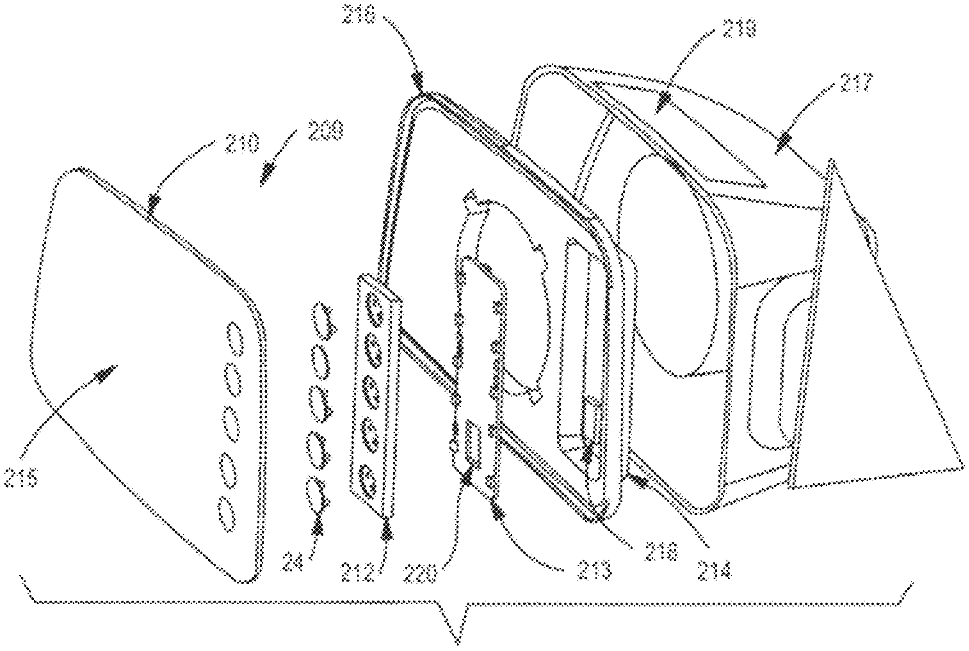
FIG. 21 illustrates an exploded view of a vehicle keyless entry assembly in accordance with another embodiment of the present invention.
Figure 22:
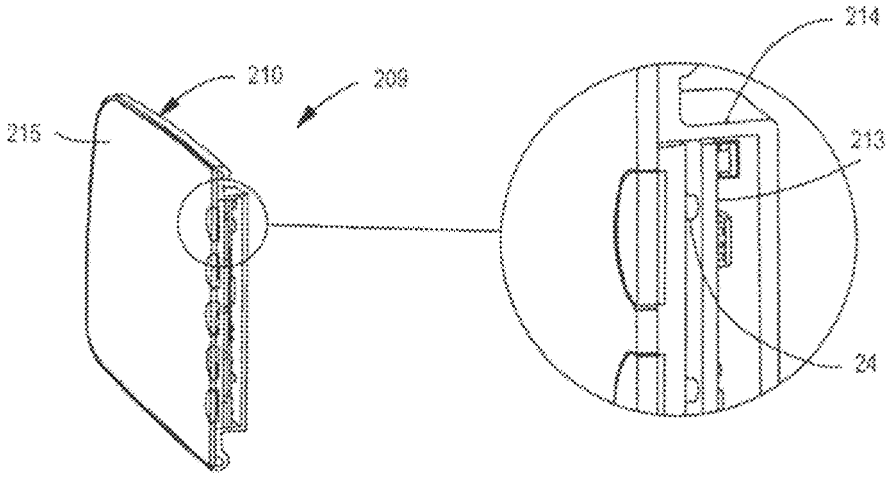
FIG. 22 illustrates a cross-sectional view and a detail view of the vehicle keyless entry assembly shown in FIG. 21.

Referring now to FIGS. 21 and 22, a vehicle keyless entry assembly 209 in accordance with another embodiment of the present invention is shown. FIG. 21 illustrates an exploded view of keyless entry assembly 209. FIG. 22 illustrates a cross-sectional view and a detail view of keyless entry assembly 209.

Keyless entry assembly 209 represents another example of an automotive application incorporating sensors 24. Keyless entry assembly 209 is for use with a user accessible vehicle component such as a window, a side-view mirror, a lens assembly, etc. As an example, the vehicle component will be described and illustrated as being a vehicle side-view mirror assembly.

As shown in FIG. 21, keyless entry assembly 209 includes a plurality of sensors 24, a carrier 212, and a printed circuit board (PCB) 213. Each sensor 24 is formed by its own thin electrically conductive pad. Sensors 24 are electrically isolated from one another. Each sensor 24 defines a unique touch pad associated with a unique touch area. As such, sensors 24 function as touch pads to activate a keyless entry function as generally described herein and as described with reference to FIGS. 7A through 7D. Each sensor 24 has a sufficient area to detect a human finger proximal to that sensor. Sensors 24 are arranged in an array and function independently of one another like an array of mechanical switches. In this example, keyless entry assembly 209 includes five individual sensors 24. As described herein, sensors 24 can serve as an interface between a human user and a vehicle to enable the user to control various vehicle functions requiring human input.

Sensors 24 are mounted firmly to respective portions of carrier 212. Carrier 212 includes electrically isolated metal wires which are electrically connected to respective sensors 24. (The wires are not shown, but may be understood with reference to FIG. 7B.) Carrier 212 and PCB 213 are arranged to be positioned next to one another. The wires of carrier 212 make an electrical connection to PCB 213 such that each sensor 24 is individually in electrical contact with the electronics of PCB 213.

As indicated, the vehicle component for use with keyless entry assembly 209 in this example is a vehicle side-view mirror assembly. Accordingly, keyless entry assembly 209 further includes a mirror sub-assembly including a side-view mirror 210, a mirror holder 216, and a mirror housing 217. Mirror 210 is held onto mirror holder 216 in the fully assembled position of mirror sub-assembly. Mirror holder 216 includes an integral housing 214. Housing 214 includes a battery 218 therein for supplying electrical energy to power keyless entry assembly 209. Housing 214 is configured to receive keyless entry assembly 209 therein. That is, housing 214 is configured to house carrier 212 with sensors 24 mounted thereto and PCB 213 positioned next to carrier 212. Mirror 210 is configured to be attached to mirror holder 216 with keyless entry assembly 209 received in housing 214 of mirror holder 216. As such, in the fully assembled position, keyless entry assembly 209 is housed between mirror 210 and mirror holder 216. In this position, sensors 24 mounted on carrier 212 are adjacent to the underside of mirror 210.

Mirror 210 is etched with a metallization layer 215 thereon. Metallization layer 215 electrically isolates sensors 24 from one another and from the mirror body. Metallization layer 215 also allows illumination of characters, if desired. Characters may be any shape, letter, or number. For non-conductive mirror surfaces or for non-mirrored surfaces, etching may not be done.

Mirror housing 217 includes a solar cell 219 for charging battery 218 positioned in housing 214 of mirror holder 216. PCB 213 further includes a transmitter 220 such as a remote keyless entry fob. Transmitter 220 enables the elimination of additional wiring into the vehicle. This allows the mirror to be a replacement. Without solar cell 219, a battery life of approximately three years is expected for a 900 mA battery. With solar cell 219, no replacement of battery 218 is needed.

Sensors 24 may be molded into carrier 212 using overmolding, two-shot molding, or other similar process. Materials for forming sensors 24 include electrically conductive rubber or plastic, metals, or other electrically conductive materials. Sensors 24 can be preformed to resemble decals, emblems, stickers, tags, and the like. Such emblems may represent or identify the vehicle to which keyless entry assembly 209 is associated. Carrier 212 may be molded clear or translucent to provide illumination options as carrier 212 can be in optical communication with a light source on PCB 213.

As described, sensors 24 are individually in electrical communication with PCB 213. Redundant connections between sensors 24 and PCB 213 may optionally be made. Sensors 24 may be sandwiched tight against mirror 210 so as to improve sensing through mirror 210.

In operation, a user interacts with the outer surface of mirror 210 in order to activate one or more of sensors 24. Electronic signal conditioning circuitry of PCB 213, which is interfaced to sensors 24, processes the input signal from the sensor(s) and completes circuit connections to activate the commanded function. The action is similar to pressing a mechanical button to complete an electrical circuit.

Figure 23:
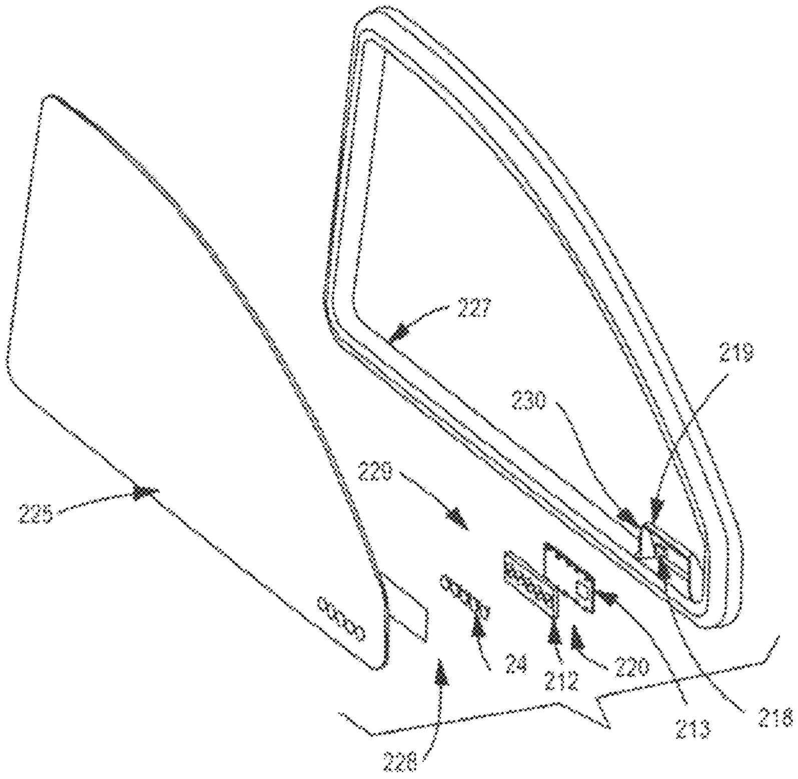
FIG. 23 illustrates an exploded view of a vehicle keyless entry or control assembly in accordance with another embodiment of the present invention.
Figure 24:
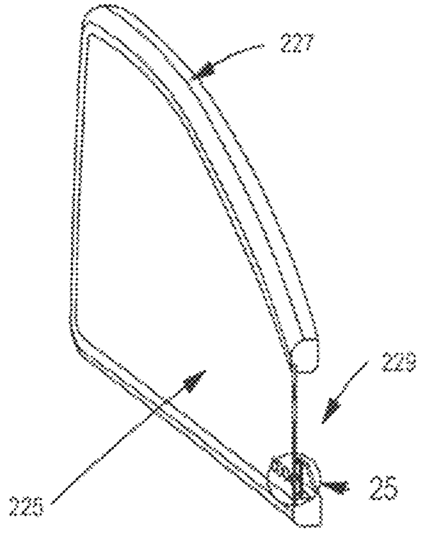
FIGS. 24 and 25 respectively illustrate cross-sectional and detail views of the assembly shown in FIG. 23.
Figure 25:
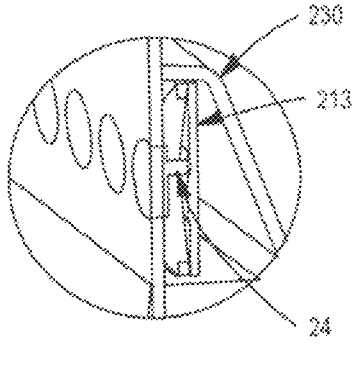

Referring now to FIGS. 23 and 24, with continual reference to FIGS. 21 and 22, a vehicle keyless entry or control assembly 229 in accordance with another embodiment of the present invention is shown. FIG. 23 illustrates an exploded view of assembly 229. FIG. 24 illustrates a cross-sectional view and a detail view of assembly 229.

Assembly 229 represents yet another example of an automotive application incorporating sensors 24. In this example, the user accessible vehicle component for use with assembly 229 is a movable vehicle window. Assembly 229 shown in FIGS. 23 and 24 includes similar components as assembly 209 shown in FIGS. 21 and 22 and like components are designated with the same reference numerals.

As shown in FIG. 23, assembly 229 includes an array of sensors 24, a carrier 212, and a PCB 213. Again, sensors 24 are electrically isolated from one another and are mounted to respective portions of carrier 212. Carrier 212 includes electrically isolated metal wires (not shown) which are electrically connected respectively to sensors 24. Carrier 212 and PCB 213 are positioned next to one another. The wires of carrier 212 make an electrical connection to PCB 213 such that each sensor 24 is individually in electrical contact with the electronics of PCB 213.

As indicated, the vehicle component for use with assembly 229 in this example is a movable vehicle window. Accordingly, assembly 229 further includes a window sub-assembly including a movable window 225 and a window trim 227. Window trim 227 includes a housing 230. Housing 230 includes a battery 218 therein for supplying electrical energy to power assembly 229. Housing 230 is configured to receive assembly 229 therein. That is, housing 230 is configured to house carrier 212 with sensors 24 mounted thereto and PCB 213 positioned next to carrier 212. As such, in the fully assembled position, assembly 229 is housed between window 225 and trim 227. In this position, sensors 24 mounted on carrier 212 are adjacent to the inside of window 225. Assembly 229 may also be integrated into vehicle system and wiring.

Assembly 229 may further include a decal 228. Decal 228 allows illumination of characters. Characters may be any shape, letter, or number. Decal 228 may be affixed to window 225. Alternatively, window 225 may be painted or other similarly processed to yield the desired effect. Further, window 225 may be etched, scribed, cast, formed, or the like to affect the optical illumination in a desired way.

Housing 230 further includes a solar cell 219 for charging battery 218 positioned in housing 230. PCB 213 further includes a transmitter 220 such as a remote keyless entry fob.

In operation, a user interacts with the outer side of window 225 in order to activate one or more of sensors 24. Electronic signal conditioning circuitry of PCB 213, which is interfaced to sensors 24, processes the input signal from the sensor(s) and completes circuit connections to activate the commanded function. The action is similar to pressing a mechanical button to complete an electrical circuit.

As explained, functionality of assembly 229 is not limited to keyless entry. Other functionality may include, but is not necessarily limited to, audio controls or other application specific items that one may want to control from outside of the vehicle such as opening a garage door or adjusting the elevation of the vehicle by integrating with an auto-leveling system.

Figure 26A:
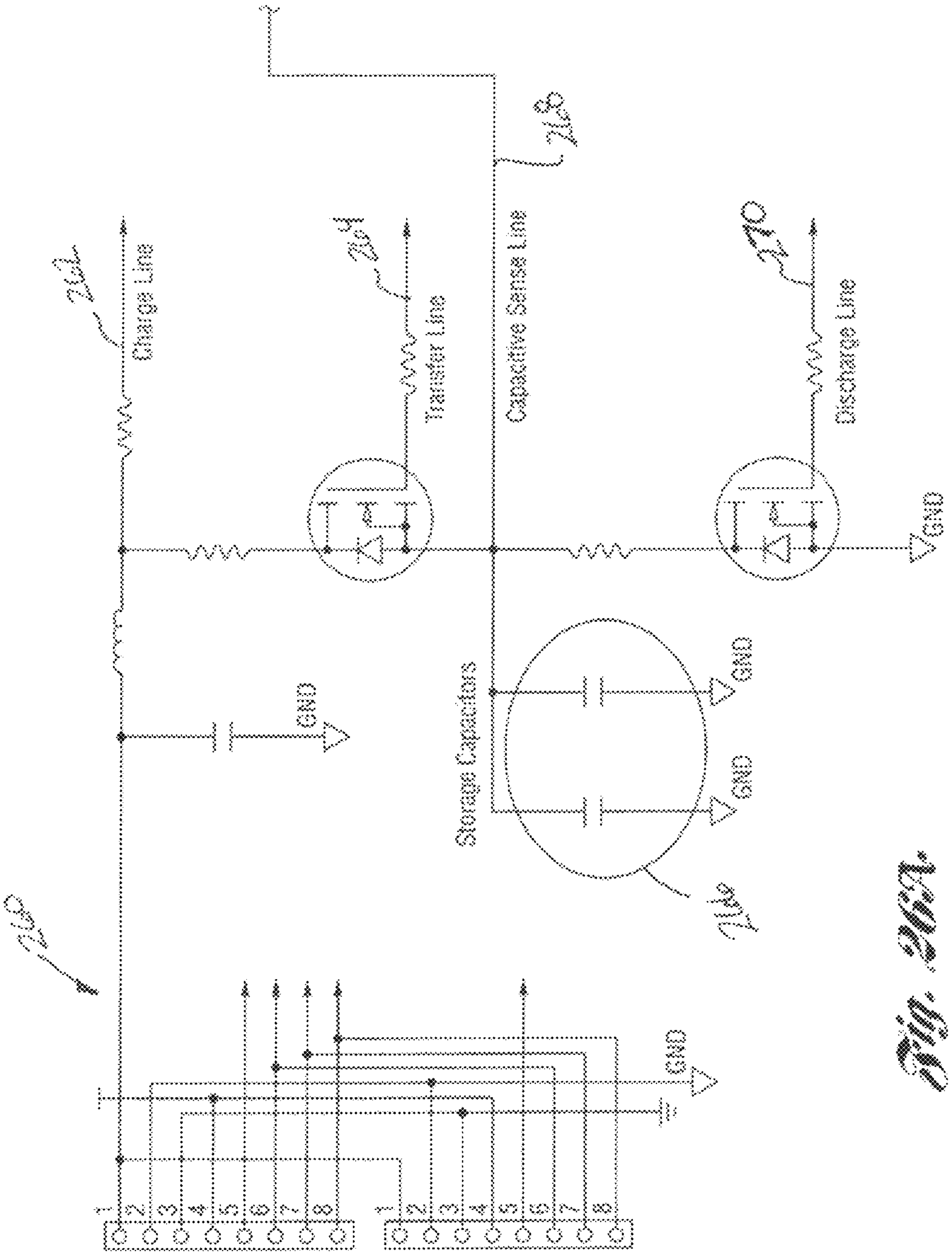
FIG. 26A illustrates a schematic diagram of electrical circuitry of a controller in accordance with an embodiment of the present invention for use with one or more sensors described herein.
Figure 26B:
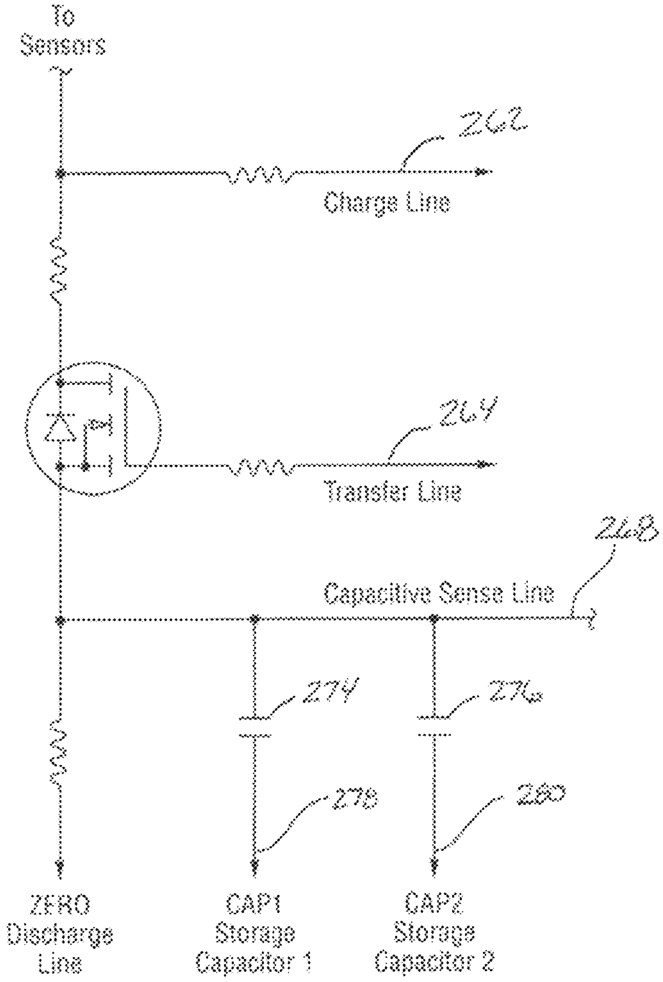
FIG. 26B illustrates a schematic diagram of electrical circuitry of a controller in accordance with an embodiment of the present invention for use with one or more sensors described herein.

FIGS. 26A and 26B are schematic diagrams of example controller functionality represented by electrical circuitry for use with one or more of the disclosed sensors. Sensors 24 having large capacitance values may make it difficult for a controller to measure small capacitive changes as the measuring capacitor has a fixed value. Typically, the input sensing and sensor capacitance values are controlled (i.e., matched). A problem is that detection of different sensing input and measuring of circuits are desired due to the detection sizes requiring varying sensor sizes and locations. The electronics input conditioning circuit allows sensors of varying capacitance to be connected to a common control.

As shown in FIG. 26A, the microcontroller 260 uses the charge line 262 to charge a sensor or multiple sensors. After the sensor is charged, the microcontroller 260 uses the transfer line 264 to transfer the charge on the sensors to the storage capacitors 266. Once the charge is stored, the microcontroller 260 takes a reading of the stored charge via the capacitive sense line 268. The storage capacitors are then discharged via the discharge line 270.

The arrangement shown in FIG. 26B provides an updated input over the electrical circuitry shown in FIG. 26A. The updated input allows for the selection of a storage measuring capacitor 274, 276 which can be used to sense the output of both a relatively small sensor (such as the sensor 24 shown in FIG. 9) and a relatively large sensor (such as the sensor 24 shown in FIGS. 3A and 3B). The controller 260 is configured to connect one or more of the storage capacitors 274, 276 to ground 278, 280, respectively, and change the number of samples of a given sensor received via capacitive sense line 268 to thereby allow varying proximity distances.

Although circuit elements are schematically illustrated for discussion purposes, it is possible to realize the functionality using a suitably programmed controller without one or more of the discrete circuit elements shown in the figures.

Figure 27:
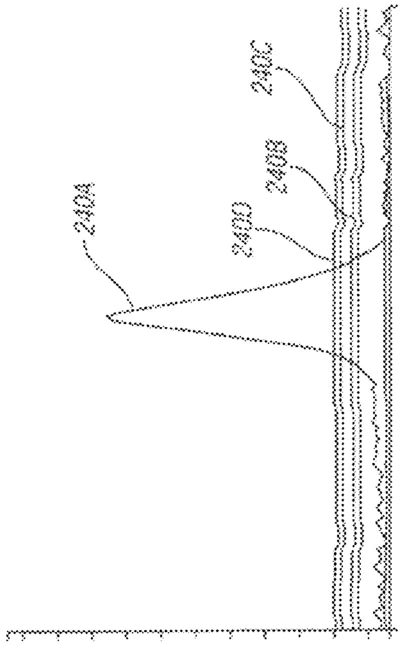
FIGS. 27, 28, and 29 illustrate examples of profiles indicative of when a desired action is requested by a user in accordance with embodiments of the present invention.
Figure 28:
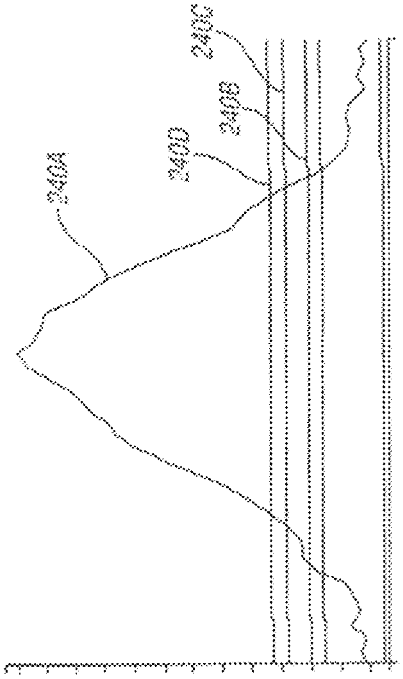
Figure 29:
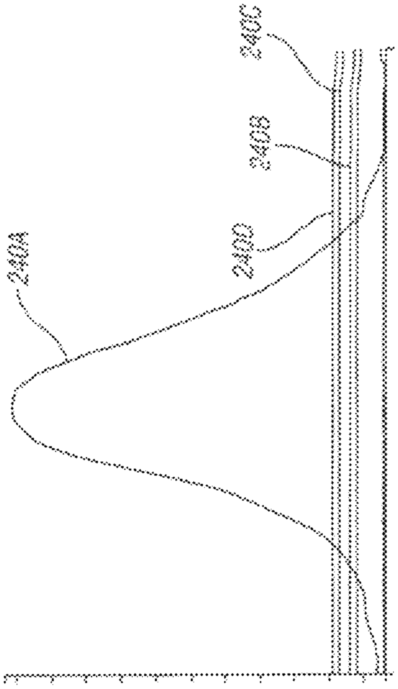
Figure 31:
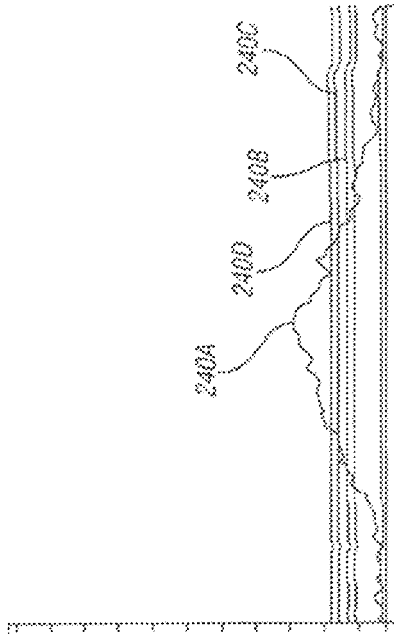
FIGS. 30, 31, and 32 illustrate examples of signal measurements that do not meet the profiles indicative of proper user requests in accordance with embodiments of the present invention.
Figure 30:
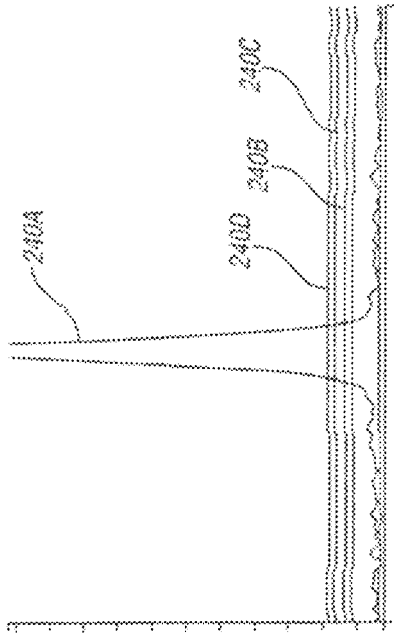
Figure 32:
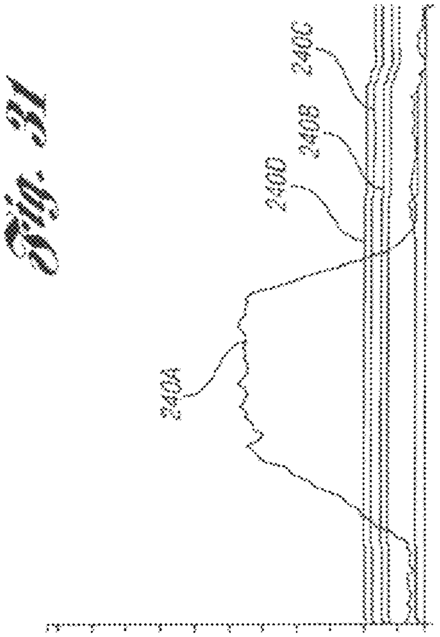

In addition to improvements in sensing, the controller enables a controlled range of motions for approach to and retraction from a vehicle having one or more sensors. The range of motion becomes a profile or gesture for the sensor(s). The profile uses signal amplitude, time, and speed to discern gesture or movement. The measured profile is compared to a predefined profile to determine a type of detected movement. FIGS. 27, 28, and 29 illustrate example profiles indicative of when a desired action (such as door opening) is requested by a user. When the rate and amplitude are within an acceptable range of those of at least one predefined profile, the user request is acknowledged. Conversely, when the rate and amplitude are outside of an acceptable range, the detected movement or actions are ignored. Regarding the latter feature, FIGS. 30, 31, and 32 illustrate examples of signal measurements that do not meet the profiles indicative of proper user requests in accordance with embodiments of the present invention.

In FIGS. 27 through 32, reference numeral 240A indicates the sensor signal and reference numerals 240B, 240C, and 240D indicate respective thresholds used in creating a profile. The time taken for sensor signal 240A to pass between thresholds 240B, 240C, and 240D corresponds to a slope for the rise time. The duration of the peak of sensor signal 240A can be set for a maximum time. When sensor signal 240A falls back to its original starting point the downward slope time is created. The acceptable amplitudes and duration can be predefined or set by a user.

Furthermore the upward slope, downward slope, and thresholds 240B, 240C, and 240D will be adaptive in that they can be modified by the controller in response to environmental temperature changes, slight changes in a user's gesture, and the like. The controller will read the temperature from a temperature sensor, thermistor, or the like and change the values of the acceptable upward slope, downward slope, and thresholds 240B, 240C, and 240D accordingly. The controller will also change the values of the upward slope, downward slope, and thresholds 240B, 240C, and 240D in response to slight changes to a user's gesture profile. A slight change is defined as a slope or threshold value that is not beyond a percent of error from the saved gesture profile. The changes can be global in that the slopes, and thresholds 240B, 240C, and 240D all change together or individual where no adjustment is dependent on the other.

A variety of techniques may be used to establish at least one acceptable profile that corresponds to a gesture that should be considered a legitimate request for system actuation. The profiles may be programmed into the controller or learned during a teach mode, for example, during which an individual repeats a gesture and the controller determines a corresponding profile. Such a profile may subsequently serve as the predefined profile for determining whether a particular gesture was detected.

As a person gestures near a sensor 24, approaches or retracts from a sensor(s) 24, the movement creates a profile amplitude, slope and rate which the controller interprets to allow operation or prevent inadvertent activation. Such inadvertent activation is prevented when a person is simply passing by sensor 24, for example. The sensor signals 240A shown in FIGS. 30, 31, and 32 are examples in which inadvertent activation is prevented as these sensor signals are outside of a predetermined authorized profile. FIG. 30 illustrates a large spike in sensor signal 240A with an upward and downward slope much larger than the predetermined authorized profile. The profile of FIG. 30 may be caused by rain or an individual bumping into the vehicle near the sensor. FIG. 31 illustrates a sensor signal 240A without a distinct upward slope or downward slope, which is caused by noise. A profile like that shown in FIG. 31 may be caused by slow movement of an individual walking past the vehicle. FIG. 32 illustrates a sensor signal 240A without a distinct peak which does not match the predetermined authorized profile. FIG. 32 shows a flat signal which represents an object entering the zone and remaining stationary for some amount of time before exiting the zone. Such a profile may be caused by someone or something moving within the activation zone and remaining there for a period of time.

Figure 33A:
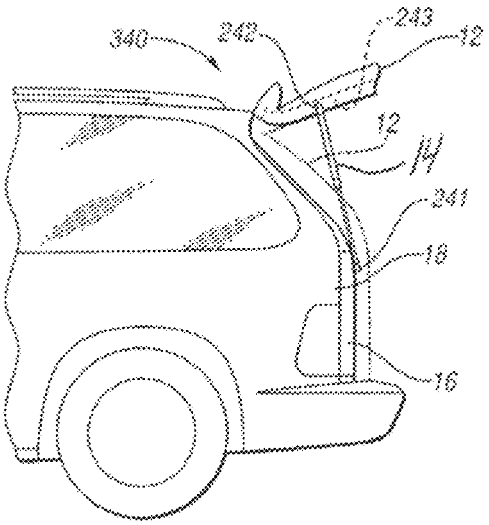
FIG. 33A illustrates a side view of a vehicle lift gate assembly in accordance with an embodiment of the present invention.
Figure 33B:
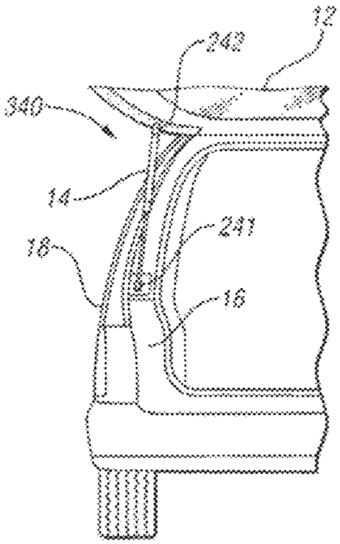
FIG. 33B illustrates a rear view of the vehicle lift gate assembly shown in FIG. 33A.
Figure 34:
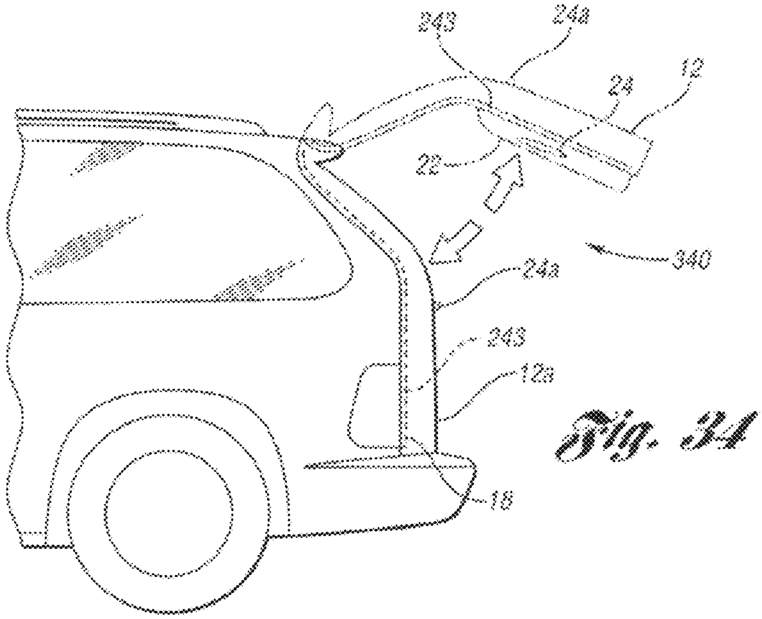
FIG. 34 illustrates another side view of the vehicle lift gate assembly shown in FIGS. 33A and 33B.

Referring now to FIGS. 33A, 33B, and 34, various views of a vehicle lift gate assembly 340 in accordance with an embodiment of the present invention are shown. Assembly 340 is a variation of vehicle lift gate assembly 20 shown in FIG. 2. Like assembly 20, assembly 340 includes lift gate 12 movably connected by strut 14 to body panel 16 of a vehicle. Lift gate 12 is movable between opened and closed positions with respect to body panel 16. Assembly 340 may include sensor 18 and an interior facial panel 22 having sensor 24. Sensor 18 is mounted along body panel 16. Fascia panel 22 is mounted to the interior surface of lift gate 12 with sensor 24 supported for movement with lift gate 12. In this example, the sensor 18 is at least partially situated between fascia panel 22 and the external structure of the lift gate 12. Sensors 18 and 24 are part of an anti-entrapment system which includes a controller.

Assembly 340 includes at least one other capacitive sensor 243. Unlike small-sized sensors which cannot obtain a proximity distance of more than a few millimeters, sensor 243 has an increased sensor size and is positioned to provide optimal detection. The assembly 340 includes two sensors 243. One sensor 243 runs along body panel 16 and another sensor 243 runs along the edge of lift gate 12. As such, a portion of at least one of the sensors 243 will be approximately perpendicular to an object in between the closure defined by the body panel 16 and the lift gate 12. The increased size and orientation of sensor 243 increases the proximity sensing to more than 50 mm which represents a relatively large increase in proximity detection.

As shown in FIGS. 33A and 33B, strut 14 is electrically isolated from the vehicle by a non-conductive material that physically separates the mounts 241 and 242 from the vehicle, thereby physically isolating strut 14 from sensor 243. Mounts 241, 242 are electrically conductive in this example. When in contact with a conductive object, strut 14 is proximity coupling with large sensor 243 which allows the strut 14 to become part of the sensor. The electrical isolation of strut 14 at mounts points 241, 242 allows them to be included in the capacitive sensing circuit. As such, strut 14 when touched by a conductive object alters the capacitance measured by sensor 243, thus improving the closure protection around strut 14. As a result, the capacitive sensor network incorporates lift gate 12 and strut 14 thereby eliminating any unmonitored strut region.

Referring now to FIGS. 34, 35A, 35B, 4A and 4B, perspective and cross-sectional views of lift gate 12 and interior fascia panel 22 of assembly 340 are shown. As shown in FIGS. 35A and 35B, sensor 243 runs along an edge of lift gate 12. Sensor 243 is configured along the edge of lift gate 12 to perform both electrically conductive object proximity detection and object touch detection. That is, sensor 243 is configured along the edge of lift gate 12 to detect an electrically conductive object in proximity to the edge or to detect an object that contacts the edge, or both.

Along the edge of lift gate 12, sensor 243 is positioned on the interior surface of an edge region of fascia panel 22 adjacently along the edge of lift gate 12 and is separated from lift gate 12 by spacers 247. Spacers 247 are constructed of electrically non-conductive materials and are compressible. Spacers 247 allow sensor 243 (and the edge region of fascia panel 22) to move spatially closer to the structural portion of the lift gate 12 as an object contacts the edge region of fascia panel 22.

As shown in FIGS. 35A and 35B, sensor 243 is angled to project the capacitive field outwardly with respect to the fascia panel 22. As a result, sensor 243 has increased sensitivity for proximity detection of objects such as people. Sensor 243 is also flexible which reduces the force of any impact associated with contact between the sensor 243 and an object.

An example construction of (lift gate) sensor 243 along the edge of lift gate 12 is shown in FIGS. 35B and 36. Sensor 243 includes a sensor body 244 and driven shield emitter body 245 which are both formed from electrically conductive plastic portions. An electrically non-conductive plastic carrier 246 isolates sensor body 244 from the emitter body 245 while angling sensor body 244 towards the region where object detection is desired. Sensor body 244 is a capacitive monitored sensor, angled towards the protected external aperture which does not require contact for detection. Sensor body 244 is connectable to a controller and emitter body 245 is connectable to a driven-body ground cancellation emitter. The driven shield emitter body 245 is electrically controlled to block out an area or region in proximity with the sensor body 244 where an undesired detection could occur. The orientation can be reversed.

The driven shield is spaced away from the vehicle ground by spacers 247. The spacing is on the order of 0.125 inches or more which increases the proximity distance by isolating the vehicle frame from emitter body 245 or sensor body 244. Spacers 247 may be integrated standoffs which provide the required separation between the ground cancellation emitter body 245 and the vehicle structure. As described, sensor body 244 and emitter body 245 are encapsulated in electrically non-conductive plastic providing a seal of sensor body 244 and emitter body 245 or contamination that could occur between them.

Sensor body 244 is flexible and deflects towards emitter body 245 when an object presses against sensor 243. Consequently, the capacitance of sensor 243 changes. As noted above, sensor body 244 is angled to provide a maximum signal in response to a conductive object in proximity to sensor 243 and to allow for deflection by an object touching sensor 243.

The sensor 243 can be placed on either lift gate 12 or body panel 16 or both as mentioned above. The sensor 243 on lift gate 12 can operate as a transmitter and sensor 243 on body panel 16 can operate as a receiver. These functions can be reversed. In operation, as lift gate 12 closes, a signal is read on sensor 243 caused by the transmitter. The controller reads that signal to become aware that lift gate 12 is almost closed. The controller then compensates for the distance yet to be traveled by lift gate 12 by knowing what the sensor 243 reading will be at each position of the lift gate 12 while unobstructed, which provides improved obstacle detection and reduced false obstacle detection caused by the vehicle body as lift gate 12 gets closer to the closed position. In one example, the controller is pre-programmed to recognize the expected sensor signal when the lift gate is closing without any obstruction. As such, sensor 243 can assist in differentiating between obstacle and vehicle body detection based on the relative position of the emitter and transmitter.

Figure 37:
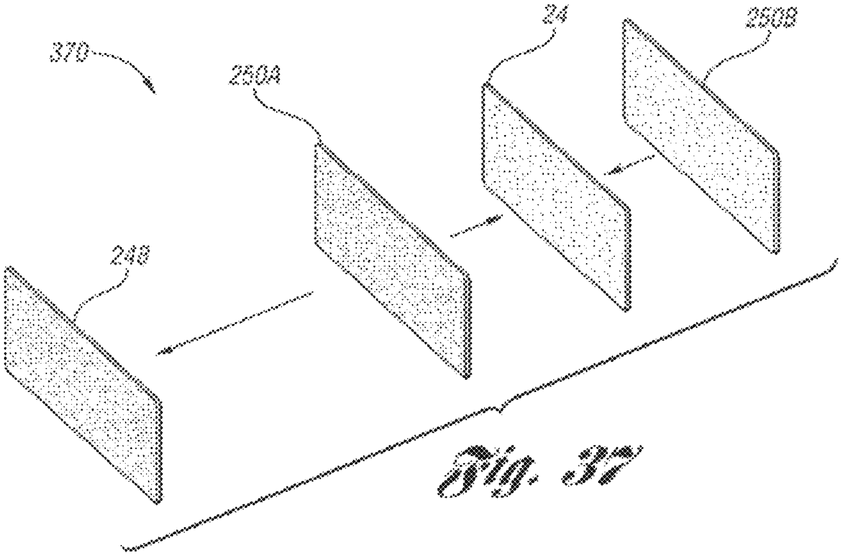
FIG. 37 illustrates an exploded view of a bumper assembly in accordance with an embodiment of the present invention.

Referring now to FIG. 37, an exploded view of a bumper assembly 370 in accordance with an embodiment of the present invention is shown. Bumper assembly 370 includes an integrated connector 248 and a sensor assembly. The sensor assembly includes a sensor 24 formed from an electrically conductive plastic material such as electrically conductive nylon. The sensor assembly further includes a front carrier 250A and a rear carrier 250B. Carriers 250A and 250B comprise electrically non-conductive plastic made from a material, such as nylon, and are over-molded onto the sensor 24 in some examples. The sensor 24 and the carriers can conform to flat or shaped surfaces.

Figure 38:
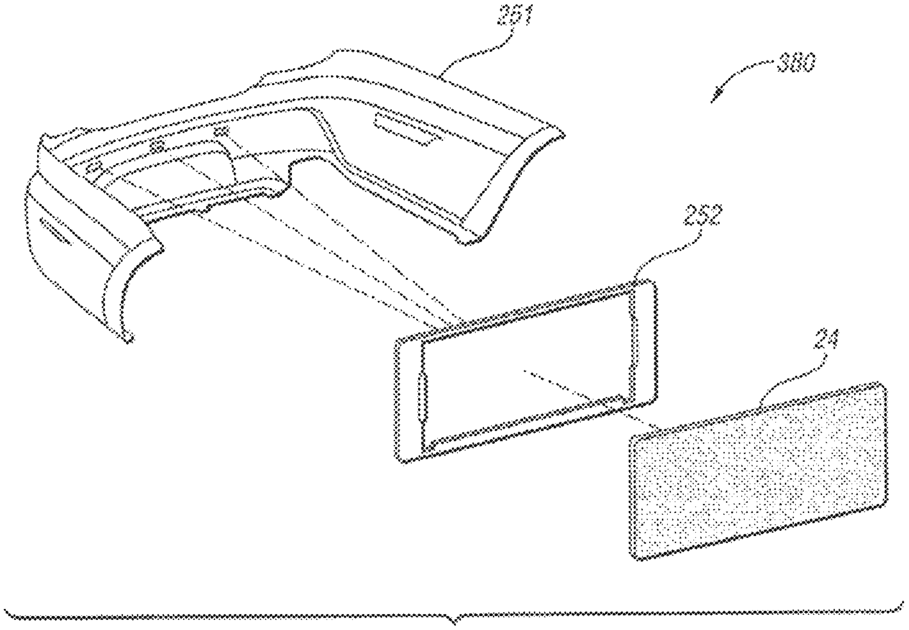
FIG. 38 illustrates an exploded view of a trim panel assembly in accordance with an embodiment of the present invention.

Referring now to FIG. 38, an exploded view of a trim panel assembly 380 in accordance with an embodiment of the present invention is shown. Trim panel assembly 380 includes a trim panel 251, an intermediate bracket 252, and a sensor 24. Bracket 252 is sandwiched between trim panel 251 and sensor 24 and is attached to trim panel 251 by weld, glue, or a fastener to thereby enable sensor 24 to be added and serviced. Another option is to create an intermediate bracket 252 that attaches to the vehicle and positions sensor 24 in close proximity to the trim. Bracket 252 may contain more than one sensor 24. For instance, bracket 252 may contain three sensors 24.

Figure 39:
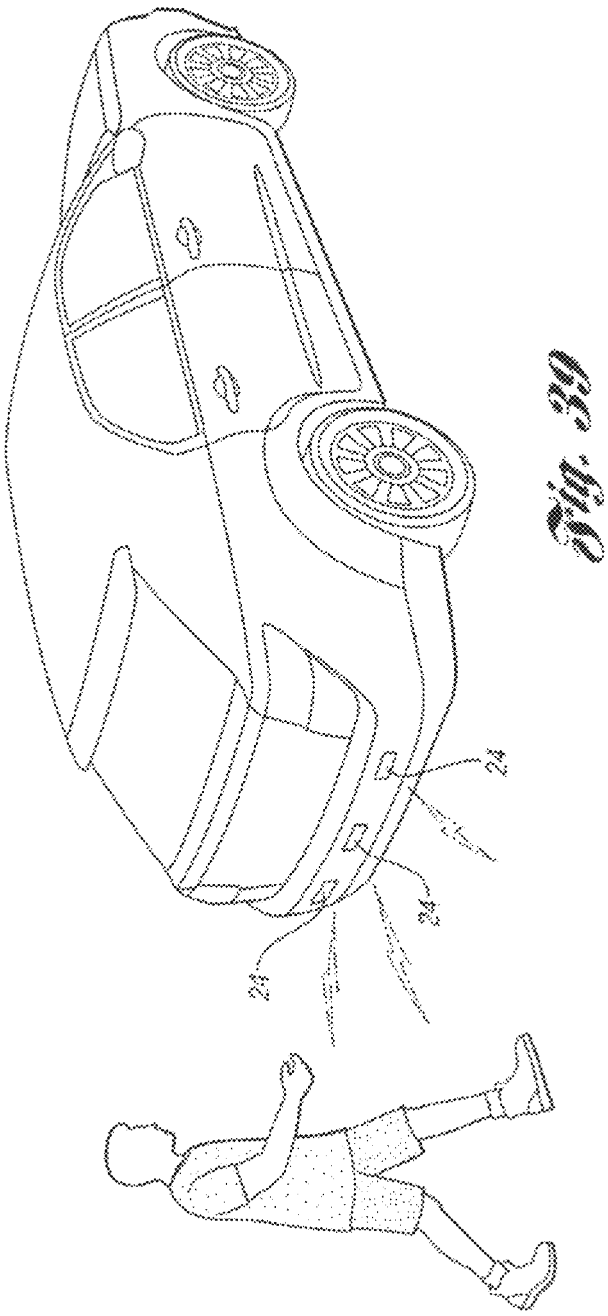
FIG. 39 illustrates a perspective view of a vehicle having sensors described herein.

Referring now to FIG. 39, a perspective view of a vehicle having a plurality of sensors 24 in accordance with an embodiment of the present invention is shown. Sensors 24 can be connected together or independently connected from one another. Each sensor 24 can have its own activation sequence and threshold to allow or prevent activation. When a person approaches the vehicle with the predetermined profile being satisfied the person can, for instance, open a panel just by approaching the vehicle without lifting a body part The use of the sensor arrangement and profile provides a secure and safer non-contact opening system.

As described, the subject matter corresponding to FIGS. 26A through 39 provides sensing improvement of nearby people via sensor placement, construction combined with sensing input circuitry, and sensor signal detection.

It is well known that there have been injuries and deaths of children who have been struck or dragged by a school bus. In an exemplary embodiment, the sensors 18, 24 could be used around a perimeter of a bus so that a bus operator will be alerted that a child is close by and caution should be exercised.

Figure 40:
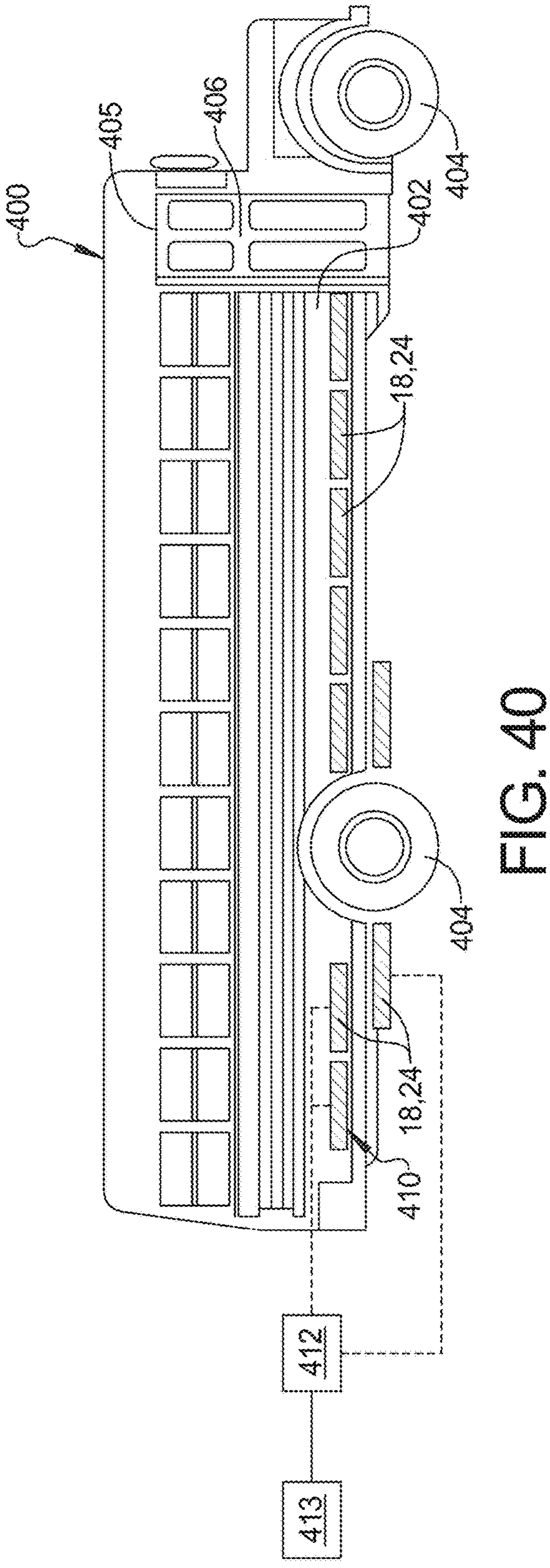
FIG. 40 is an elevational view of a bus having sensors disposed about a perimeter thereof, according to one embodiment of the present invention.
Figure 41:
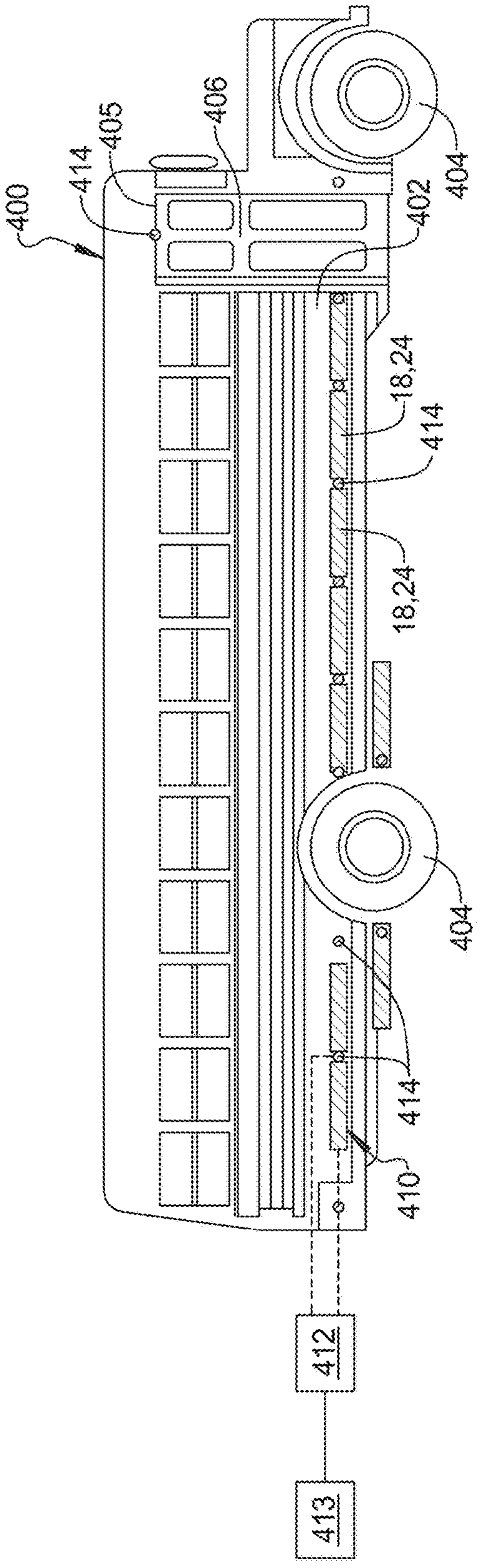
FIG. 41 is an elevational view of a bus having sensors disposed about a perimeter thereof, according to another embodiment of the present invention.
Figure 42:
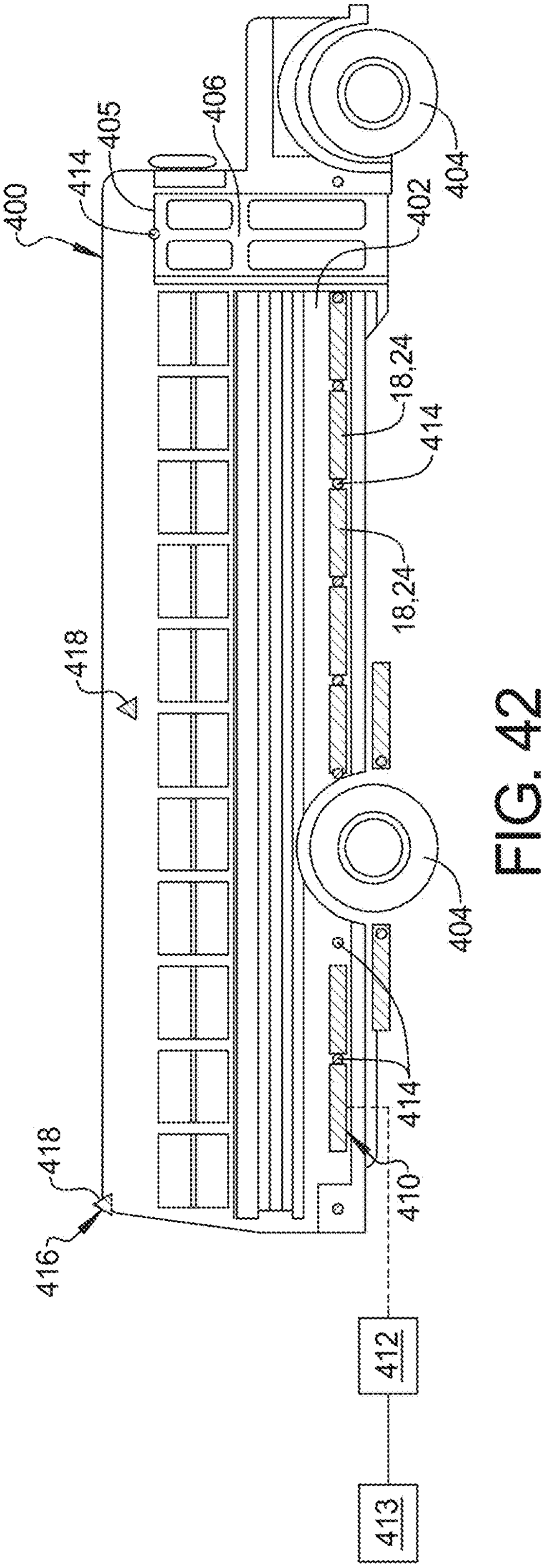
FIG. 42 is an elevational view of a bus having sensors disposed about a perimeter thereof, according to yet another embodiment of the present invention.
Figure 43:
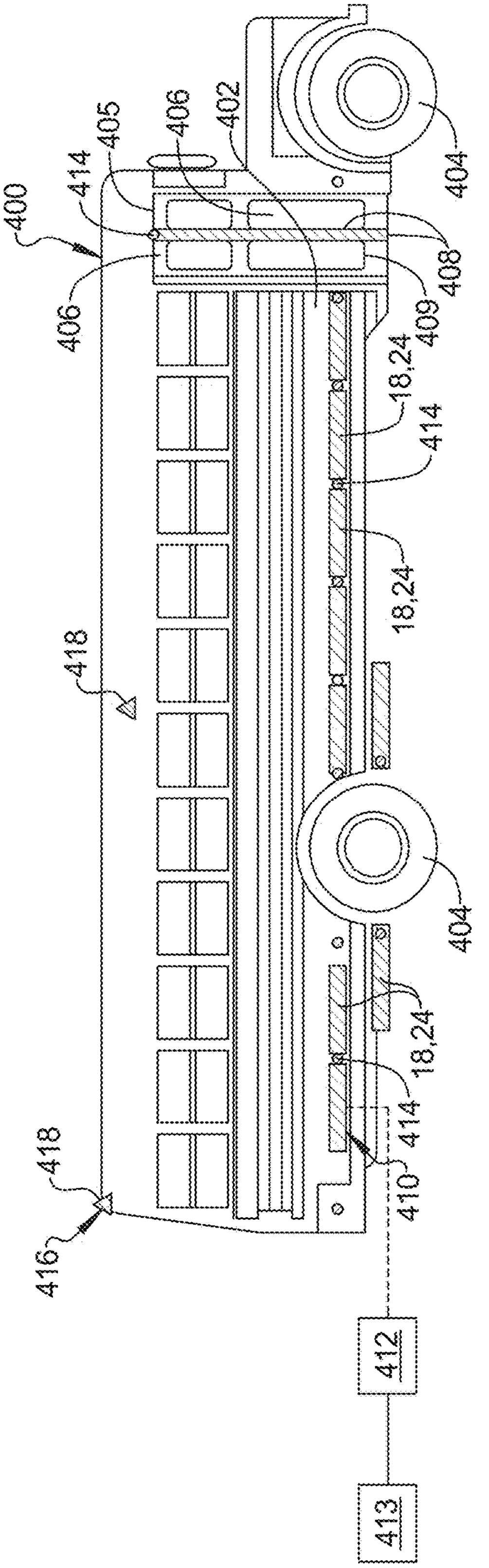
FIG. 43 is an elevational view of a bus having sensors disposed about a perimeter thereof, according to still another embodiment of the present invention.

Referring now to FIGS. 40-43, various views of a vehicle such as the bus, generally indicated at 400, in accordance with various embodiments of the present invention are shown. FIG. 40 shows a sensor or sensing system, generally indicated at 410, adhered to a perimeter of the bus 400 for the detection of an object such as a child. The bus 400 includes a vehicle body 402, a plurality of wheels 404 coupled to the vehicle body 402, a door opening 405, and at least one door 406 coupled to the vehicle body 402 to open and close the door opening 405. In FIG. 43, a pair of doors 406 are illustrated to open and close the door opening 405. In one embodiment, each door 406 has at least one weather seal 408. As illustrated in FIG. 40, the sensors 18, 24 shown are representative of capacitive type sensors that will have a predetermined surface area in order to achieve the desired sensing range that is required. Breaking up the sensing area into smaller sections (as shown in FIG. 40) the overall signal strength per sensor 18, 24 is increased, and a location of the conductive object can readily be determined. It should be appreciated that the sensors 18, 24 are mounted or coupled to the vehicle body 402

The two sensors 18, 24 located fore and aft of the rear wheel 404 are for specific sensing of a child under the bus either directly ahead of or behind the wheel 404. The sensor system 410 such as what is described can be used around the full perimeter of the bus 400 for a full 360 degree sensing area. It should be noted that with each sensor 18, 24 of the sensing system 410 are independent from each other and certain patterns of sensing can be seen and used to aid in overall assessment of the area. For example, if a child is walking beside the bus 400 and moving toward the front of the bus 400, each sensor 18, 24 that the child walks by will detect their presence in turn, one after another. The sensor system 410 include a system controller 412 coupled to or in communication with the sensors 18, 24 and provides information about where the child is, how fast they are moving, approximate distance from the bus 400, and direction of travel toward or away from the bus 400 further enhancing the situational awareness surrounding the bus 400. The system controller 412 is mounted or coupled to the vehicle body 402. The dynamics of the sensing can be seen and analyzed to determine if it matches a particular predetermined signal or path. The analyzing of the signal and its conformity to a particular pattern has been termed as a gesture in some literature. The sensor system 410 includes an alert 413 connected to or in communication with the system controller 412 that alerts the operator of the bus 400 when the child is detected by coupling to the sensor 18, 24. In one embodiment, the alert 413 may be an audible alarm, a visual alarm, etc. It should be appreciated that the alert 413 is located inside the bus 400 and coupled to the vehicle body 402. It should also be appreciated that the system controller 412 is connected to or in communication with the sensors 18, 24.

FIG. 41 has all the features described in FIG. 40 with the addition of a plurality of ultrasonic sensors 414 with one of the ultrasonic sensors 414 being located between each capacitive sensor 18, 24. A benefit to having both sensor types on the perimeter of the bus 400 is the ultrasonic sensors 414 can sense objects further away from the side of the bus 400, and the capacitive sensors 18, 24 can detect an object close to the side of the bus 400 when the object falls between ultrasonic sensors 414 and as such would not be sensed. It should be appreciated that the ultrasonic sensors 414 are connected to or in communication with the system controller 412.

Another exemplary embodiment shown in FIG. 42 is to include a camera system, generally indicated at 416, that provides full 360 degree vision. The camera system 416 includes at least one camera 418 connect to or in communication with the system controller 412. The addition of the camera system 416 allows for at least two further aspects to the situational awareness of the operating environment of the bus 400. Firstly it allows the driver of the bus 400 to visually see around the entire perimeter of the bus 400, allowing for a cognitive decision on whether it is safe to move the bus 400. A second aspect is that the video feed from the camera system 416 could be fed into an electronic sensing module that can interpret the video images and determine when it is safe to move the bus 400. It should be appreciated that the camera 418 is mounted or coupled to an exterior of the vehicle body 402. It should also be appreciated that the camera 418 is connected to or in communication with the system controller 412.

FIG. 43 shows the sensing system 410 with the addition of the capacitive type sensors 18, 24 to the weather seals 408 on the portion of the doors 406 that come together when the doors 406 are closed. The sensor 18, 24 in the seals 408 can detect if a child or backpack is in the way of the door 406 closing or is trapped by the door 406. Reference U.S. Pat. No. 9,389,062 for a description of such a sensor, the entire disclosure of which is hereby incorporated by reference. Again, the ultrasonic sensor 414 could be used to enhance the sensing system 410 to ensure a child is never trapped in the door 406. The ultrasonic sensor 414 could be installed on the ceiling of the bus 400 with the sensing area being a step well 409 in the vehicle body 402 for the door opening 405 through which a child must pass. The sensor 18, 24 could be configured such that when the doors 406 are open the sensing range also reaches outside of the bus 400 a certain distance. In this case, if a child is off of the bus 400 but has stopped just off the last step, a backpack worn by the child may become trapped if the doors 406 were closed. With the ultrasonic sensor 414 being able to sense a certain distance from the bus 400 allows the sensing system 410 to alert the driver to not shut the door 406, or to prevent the door 406 from closing.

Figure 44:
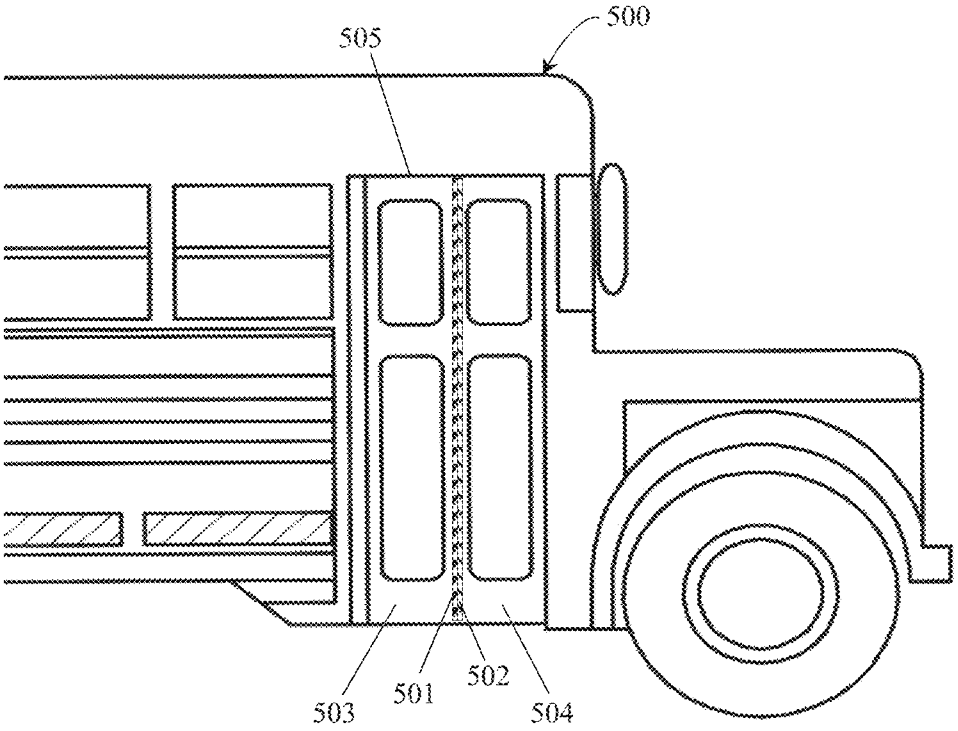
FIG. 44 is a partial elevational view of a bus having sensors disposed on a movable panel hinged on either side of an opening that allows entry and exit thereof, according to another embodiment of the present invention.

Referring now to FIG. 44, a capacitive sensing sensor or capacitive sensor is integrated into a sealing system 510 such as a door sealing system as typically found on a vehicle such as a bus, more specifically a school bus 500. In one embodiment, the sealing system 510 includes a nosing seal 502 (hereafter called nosing) of a fore door 504 mates with a weather seal 501 mounted to an aft door 503, the doors 503 and 504 sealing the door opening 505 of the school bus 500. It should be appreciated that the sealing system 510 may be used for other than doors such as a power lift gate, sunroof, etc.

Figure 45:
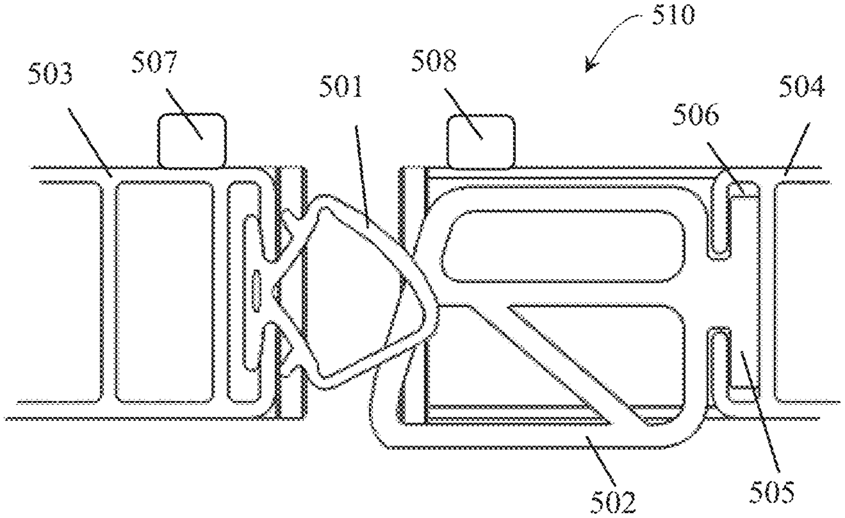
FIG. 45 is a sectional view taken along line 45-45 of FIG. 44.

FIG. 45 is a sectional view of the sealing system 510 at the interface between fore and aft doors 504 and 503 respectively in the closed position, and the nosing seal 502 and the weather seal 501, respectively. As illustrated, the weather seal 501 is not shown in a compressed position, but in a relaxed position to better show the relationship between the nosing seal 502 and the weather seal 501. In this embodiment, the nosing 502 is mounted to the fore door 504 by a 'T' feature 505 and is inserted into a slot 506 of the door 504.

Figure 46:
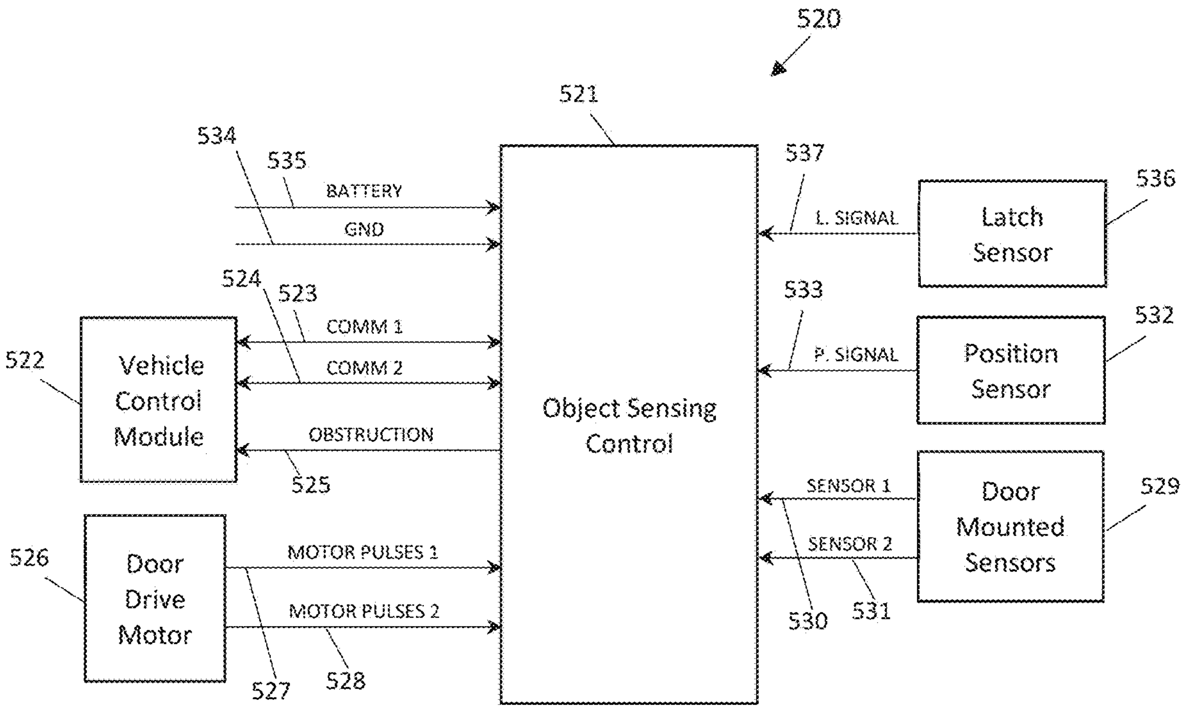
FIG. 46 is a block diagram of a system that utilizes sensors to detect when an object comes into proximity or contact with a moving panel as it moves, according to an embodiment of the present invention.

Now referring to FIG. 46, an Object Sensing System 520 is shown. In one embodiment, the system 520 includes vehicle power connections battery 535 and ground 534, an object sensing control 521, communication mechanism to communicate with at least one module of the vehicle such as vehicle control module 522 through communication signals 523, 524 as well as obstruction signal 525, inputs 527, 528 from a panel drive motor 526, a latch signal 537 from a latch sensor 536, a position signal 533 from a position sensor 532, and sensor signals 530, 531 from a plurality of panel mounted sensors 529.

Figure 48:
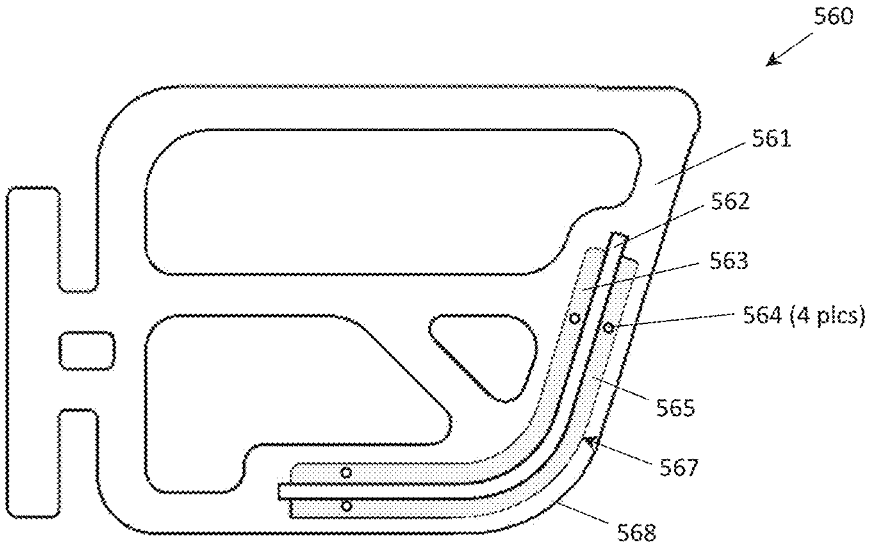
FIG. 48 is a sectional view of a moving panel nosing seal with sensing elements, according to an embodiment of the present invention.

FIG. 48 shows one embodiment of a nosing sensor 560 with an obstruction detection sensor 567 embedded in the nosing 561. In this embodiment, the obstruction detection sensor 567 is coextruded into the nosing 561 and includes at least two sensing elements 565 and 563, conductors 564, and dielectric layer 562, with sensing element 563 being distal to a nosing outer surface 568 and the sensing element 565 being proximal. In one embodiment, the sensing elements 565, 563 are electrically conductive thermoplastic elastomer (TPE) or other electrically conductive material that provides the necessary physical and electrical properties to form the obstruction detection sensor 567. While sensing elements 565, 563 of FIG. 48 are shown with two conductors 564 embedded in each, the number of conductors 564 in each element may be less or may be more depending on specific application requirements. In one embodiment, the conductor 564 is a metal wire, either stranded or solid, that travels the length of the sensing element 563, 565. In one embodiment, the dielectric layer 562 can be air or any formable or compressible material such as a soft durometer material or a foamed material either of which will become thinner as a force is applied to the outer surface 568 of the nosing 561.

Figure 50:
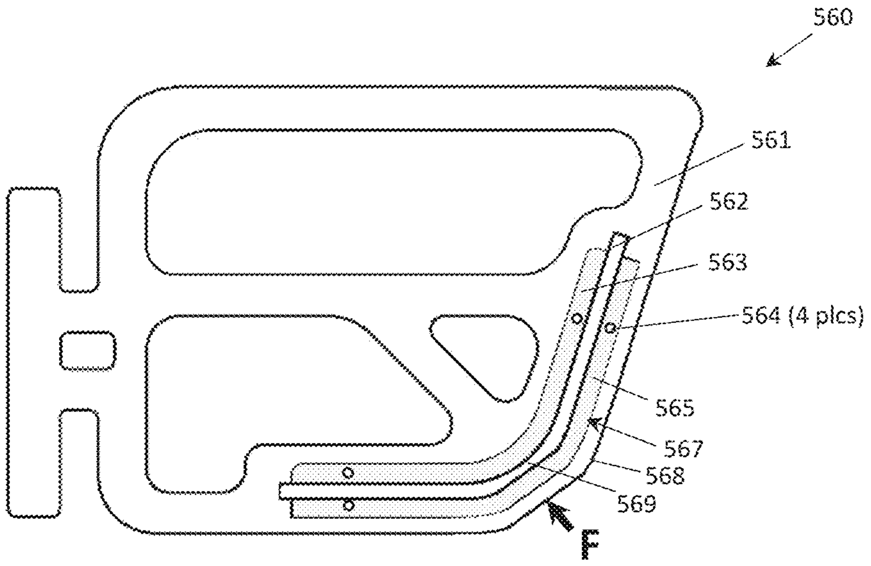
FIG. 50 is a sectional view of a moving panel nosing seal with sensing elements in a partially compressed state, according to an embodiment of the present invention.
Figure 51:
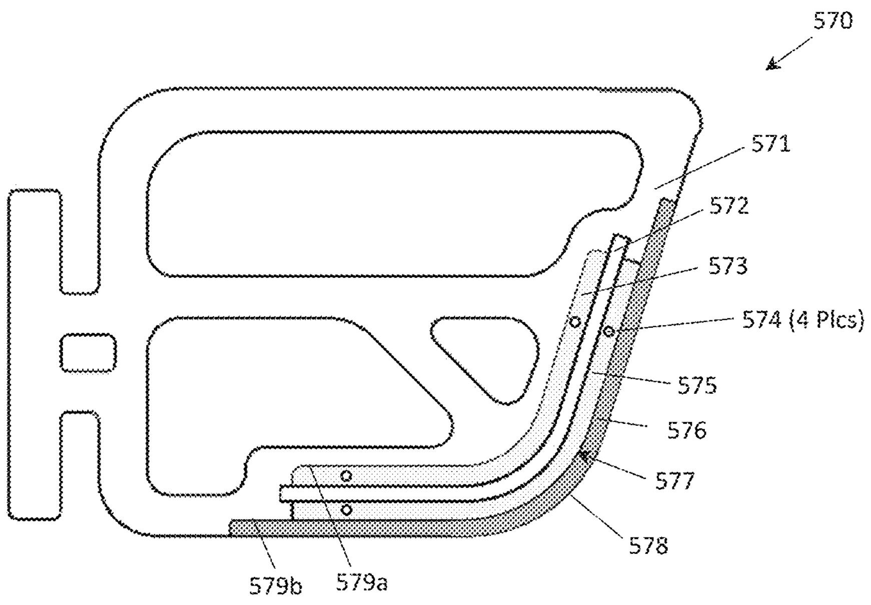
FIG. 51 is a sectional view of a moving panel nosing seal with sensing elements embedded behind an outer cover, according to an embodiment of the present invention.

FIG. 51 is another embodiment of the nosing sensor 560 shown and described in FIG. 48 and FIG. 50. In this embodiment, the sensor 577 is formed by inserting a sensing element 573 and adhesively attached to a receiving area 579*a* of the nosing 571. A sensing element 575 is adhesively attached to an outer layer 576 and then the sensing element 575 and the outer layer 576 is adhesively attached to a receiving area 579*b* of the nosing 571. It should be appreciated that the structure of FIG. 51 will also compress as that of FIG. 50, when a force is applied to the outer surface 578.

While the sensing elements 565, 563 have been described as a TPE in one embodiment, it should be appreciated that the sensing elements 565, 563 can be any material with sufficiently low resistivity, such as other conductive elastomers, plastics, or silicon rubber; as well as metal strips or metal braid. It should be appreciated that an advantage of using metal strip or braid is that conductors 564 will not be required as the metal strip or braid is of sufficiently low resistivity to eliminate the need for the conductors.

The nosing sensors 560 shown in FIGS. 48-51 sense a change in capacitance either by proximity to a conductive object or by compression of any object according to the well-known formula for capacitance, $$c = \frac{\varepsilon_0 \varepsilon_r d}{A}.$$

The capacitive sensing process and methods are detailed in U.S. Pat. No. 7,513,166 to Shank et al., the entire disclosure of which is hereby expressly incorporated by reference. The object sensing controller 521 of FIG. 46 monitors the capacitance of the sensors represented by sensor signals 530 and 53 land determines if an object is in proximity to, or made contact with, a plurality of panel mounted sensors 529. It should be appreciated that, if signals 530, 531 exceed a defined limit, an entrapment is indicated.

Figure 50A:
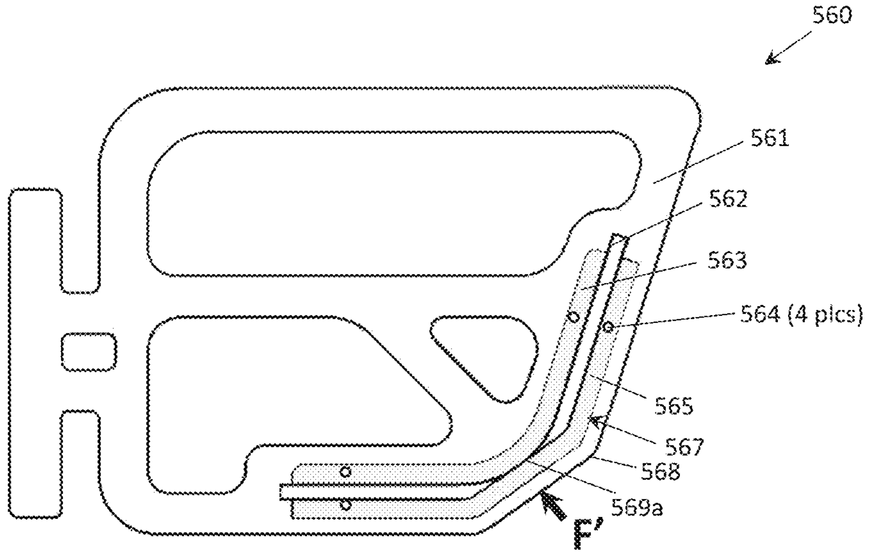
FIG. 50*a* is a sectional view of a moving panel nosing seal with sensing elements in a compressed state and making contact with each other, according to an embodiment of the present invention.

FIG. 50 shows the sensor nosing 560 in contact with an obstructive force F and the resulting compression of the sensor 567 and the thinning of the dielectric layer 562 at location 569. FIG. 50*a* shows higher force F' applied to the nosing outer surface 568 such that proximal element 565 comes into contact with the distal element 563. It should be appreciated that, when this occurs the capacitive sensing ability of the sensor 567 is negated and the sensing elements 565 and 563 act as a physical switch indicating to controller 521 that an obstruction is present.

Figure 52:
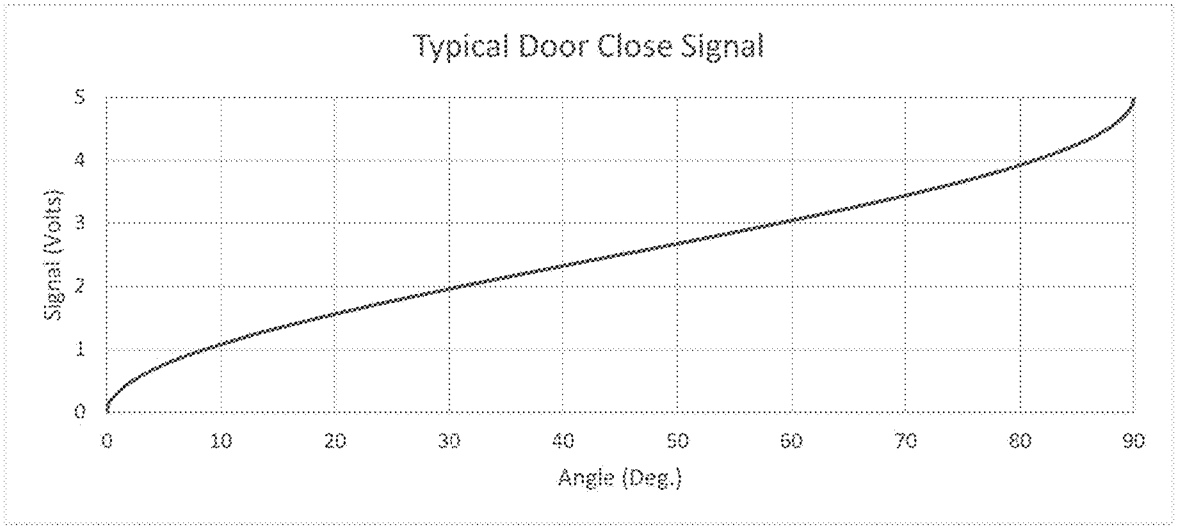
FIG. 52 is a graph showing a typical relationship between signal voltage and positional angle of moving panel, according to an embodiment of the present invention.

Another part of the sensing system 520 of FIG. 46 includes a position sensor 532. The position sensor 532 is located in proximity to a pivot hinge 541 of FIG. 47 and senses and provides absolute position of a door 538 by providing the sensing system 520 with a voltage that represents the angle α 540 of the door 538. Angle α is the position of the door 538 between the full open and full closed positions. It should be appreciated that a door being driven closed will close at a typical rate when there is no obstruction in its closing path. If, however, there is an obstruction, say of a child or a child's backpack, the position sensor output 533 will no longer be a smooth typical signal as would be expected if there were no obstruction. FIG. 52 shows a graph of output 533 of the position sensor 532 during a no obstruction door closure. It should be appreciated that one can see a ramp up in speed as it closes from 0 degrees to about 30 degrees. After ramping up, the speed of the door, and hence the position sensor output 533 rate of change, is relatively stable. Then, as the door is entering the closed position it begins to slow down starting at about 70 degrees as the nosing sensor 560 and the weather seal 561 compress together to the final closed position.

Figure 53:
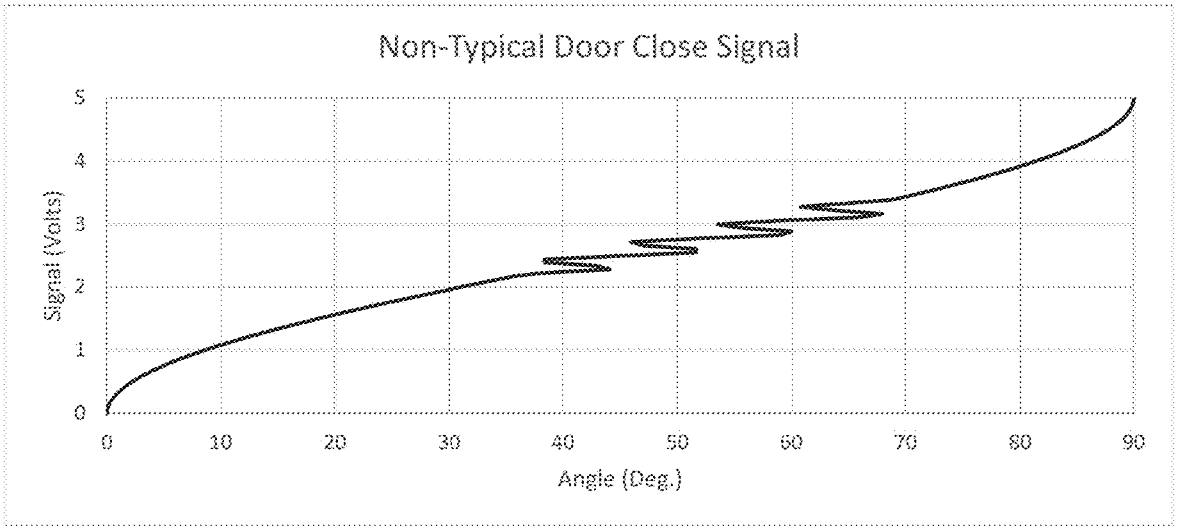
FIG. 53 is a graph showing a non-typical relationship between signal voltage and positional angle of a moving panel, according to an embodiment of the present invention.

FIG. 53 shows a graph of output 533 of the position sensor 532 during a close with an obstruction. The obstruction may be a person, an object such as a backpack, or a strap that gets entrapped or impedes normal door movement. The position sensor signal 533 will fluctuate if the door motion is impeded or repeatedly moved in the case of someone tugging on a caught strap. An example of the position sensor output signal being fluctuated by tugging is shown between the 40 and 60 degree positions. The signal fluctuation may not be monotonic, indicating that there is an obstruction and/or tugging on the door.

Figure 54:
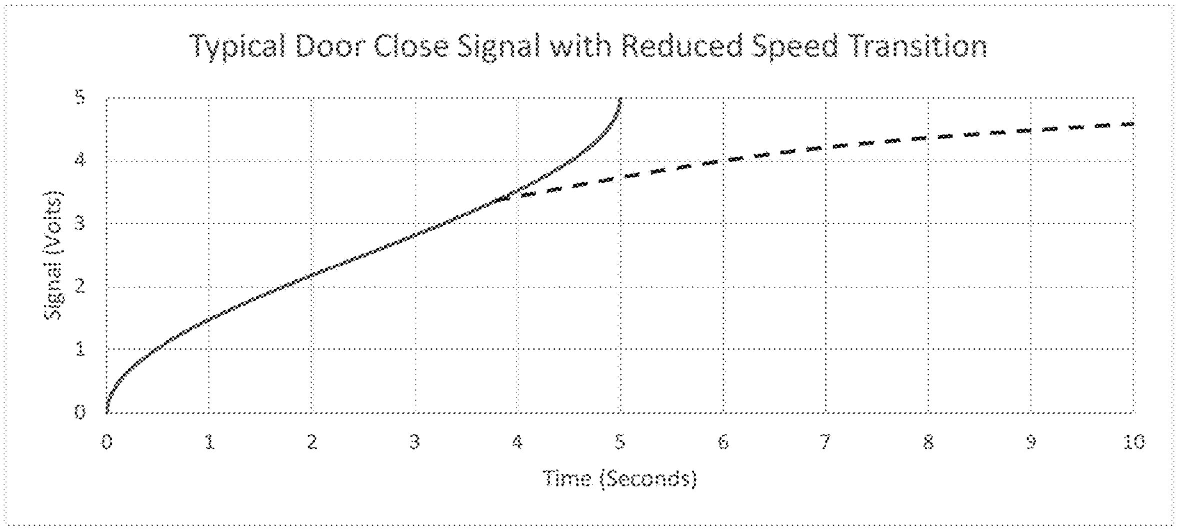
FIG. 54 is a graph showing a relationship between signal voltage and positional angle of a moving panel when speed of the moving panel is slowed, according to an embodiment of the present invention.

FIG. 54 is yet another graph that shows output 533 of the position sensor 532 when an obstruction is present and the door 538 is impeded such that the output 533 is significantly slowed. This figure is shown in the time domain indicating that it takes approximately five (5) seconds for the door to travel from full open to full close. At approximately halfway through the door travel path an obstruction occurs that slows the door down and impedes it from closing fully, as indicated by a dashed line. In this situation, the sensing system 520 senses that the door has not closed after ten (10) seconds and determines that an obstruction is present.

Figure 55:
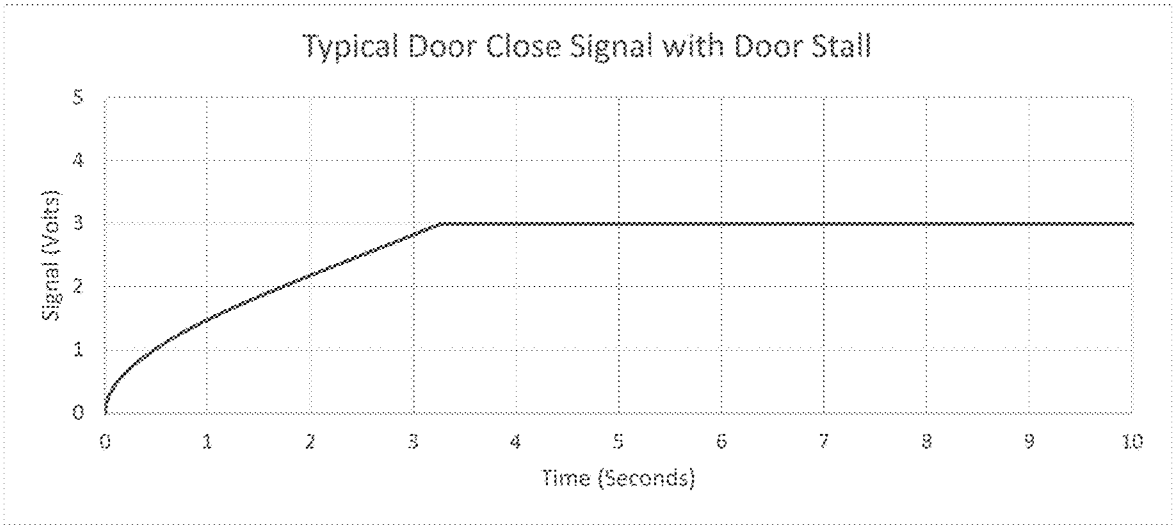
FIG. 55 is a graph showing a relationship between signal voltage and positional angle of a moving panel when speed of the moving panel is stalled, according to an embodiment of the present invention.

In yet another example, FIG. 55 shows a graph of the sensor output 533 of the position sensor 532 when an obstruction is present about halfway through normal travel distance and time. The door 538 is stalled to where no movement occurs. In this situation, the sensing system 520 senses that the door has stalled and determines that an obstruction is present.

Another part of sensing system 520 of FIG. 46 is a latch sensor 536. The latch sensor 536, located on the door frame 542 of FIG. 47, and the latch receiving portion 507, 508 of FIG. 45, senses and provides an indication when the doors are in the fully closed position by providing the sensing system 520 with a latch signal 537 when the latch sensor 536 is activated by a latch receiver portion 507, 508 of the door.

Still another portion of the sensing system 520 of FIG. 46 is a door motor drive 526. The door drive motor 526 provides object sensing control 521 and motor pulse signals 527 and 528. The motor pulse signals 527 and 528 are pulses that come from a motor indicating the speed and direction of rotation. Typical methods used in industry include two types. A first method having the signals in quadrature, i.e., both motor pulse signals 527, 528 have pulsed waveforms with one waveform being 90 degrees out of phase with the other. By doing this, rotation speed and direction can be obtained. Another method has one motor pulse signal 527 having a pulsed waveform and the other motor pulse signal 528 having a high or low signal indicating which direction the motor is rotating, clockwise or counterclockwise. It should be appreciated that both of these methods are well known in the art and will not be further detailed.

Figure 47:
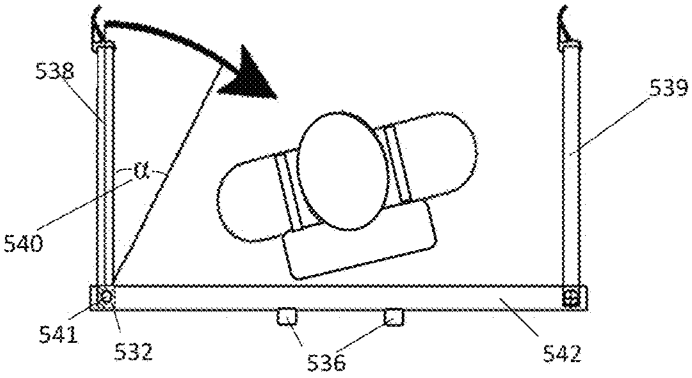
FIG. 47 is a diagrammatic view showing angular movement of panels that close an opening, according to an embodiment of the present invention.

Alternately, the doors 538 and 539 of FIG. 47 may be actuated pneumatically instead of with an electric motor. When the doors 538,539 are actuated pneumatically, the position sensor 532 is used to provide the position sensor signal 533, instead of the motor pulse signals 527, 528 to the object sensing control 521.

The diagram of FIG. 46 shows a vehicle control module 522 in communication with the object sensing control 521 through communication signals 523, 524. The vehicle control module 522 or other control modules may control the motor and pneumatic actuation described previously, but it should be appreciated that the object sensing control 521 or another control of the sensing system 520 may control both motor and pneumatic actuation instead of or in conjunction with vehicle control modules.

The sensing system 520 provides means to detect and protect against entrapment of a person or object by using the object sensing control 521 to gather and interpret signals. By using the sensing means described, a multi-redundant system is created to ensure that people or objects do not get entrapped in a moving panel that is closing.

Figure 56:
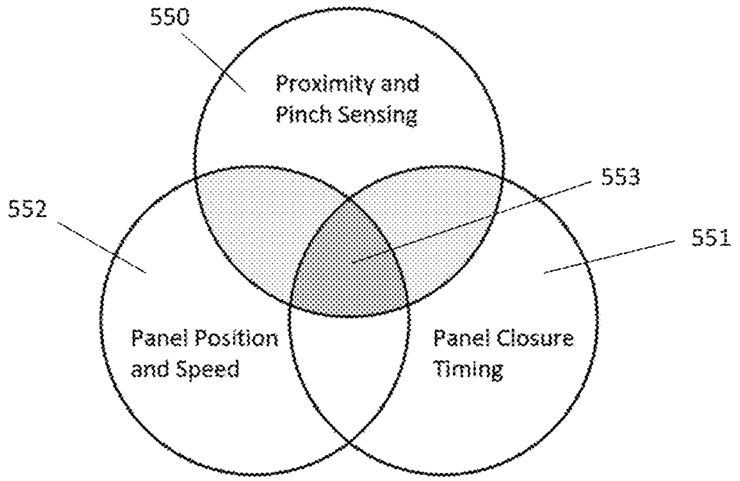
FIG. 56 shows the interaction between sensing modalities to enhance determining if an obstruction exists during the closing of a moving panel, according to an embodiment of the present invention.

FIG. 56 is a Venn diagram with three modalities shown: Proximity and Pinch Sensing 550, Panel Closure Timing 551, and Panel Position and Speed 552. The first modality, proximity and pinch sensing, is a nosing sensor such as those shown in FIGS. 48-51. The nosing sensor 560 of FIG. 48 will sense a capacitance change when an electrically conductive object is in proximity or there is contact with any object and an obstruction will be indicated. The second modality, panel position and speed, is provided by the position sensor 532 of the sensing system 520. As the panel moves from an open to closed position, its output signal 533 changes based on where the moving panel is located as defined by its angle relative to full open and full closed positions. It can be appreciated that the panel has a normal or typical close time, that is to say, the panel will close at a rate given in degrees per second. The object sensing controller 521 will monitor the rate of panel closure, and if the rate falls out of an expected range, an obstruction will be indicated. The sensor signal 533 will also be monitored for any disturbance in the expected profile, or signature, as well as the signal monotonicity. A third modality, panel closure timing is yet another means to determine proper unobstructed closure of a moving panel. The moving panel will close beginning at an open position and ending in a close position. When the panel is fully closed it is latched into position by the latch mechanism 536 of FIGS. 46-47. After latching is complete, the latching sensor 536 sends a latch signal 537 to the object sensing controller 521. The closing operation will have a normal or average timeframe in which to transition the panel from full open to full close. If the latch signal does not fall in the expected time window for a normal closure, or is not received at all, an obstruction will be indicated.

Figure 57:
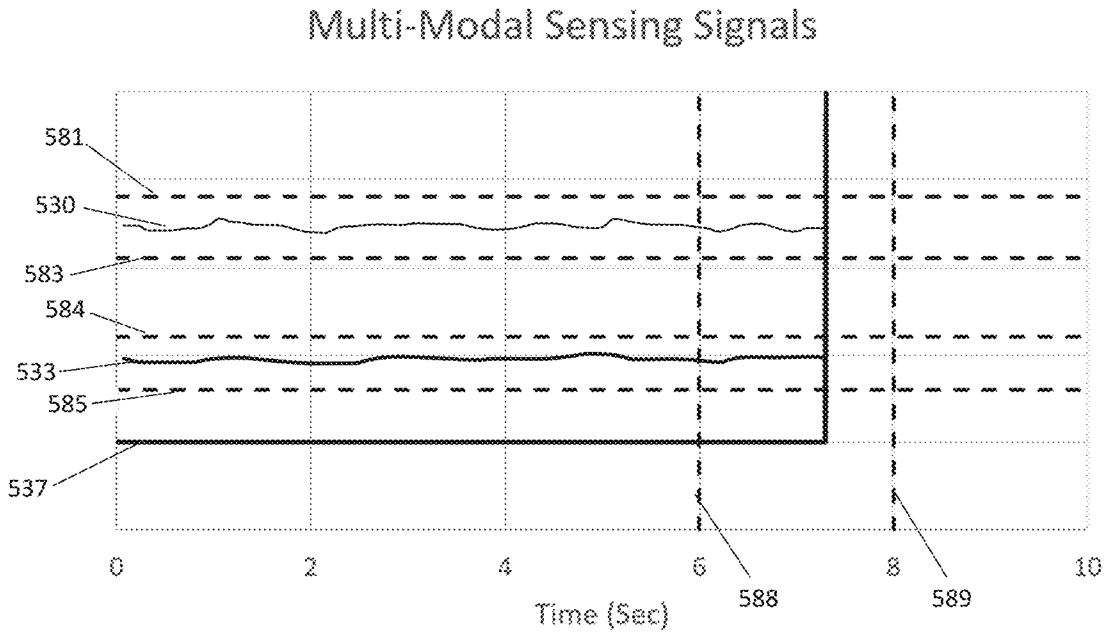
FIG. 57 shows a graph with various sensor signals with minimum and maximum expected limits for each signal, according to an embodiment of the present invention.

Referring now to FIG. 57 with continual reference to FIG. 46 a graphical representation of the sensed signals 530, 533, 537 are shown with expected limits for each. The door sensor signal 530 is shown with an upper limit 581 and a lower limit 583. If the door sensor signal 530 remains between the upper limit 581 and lower limit 583 during the closure of a moving panel, a normal unobstructed closure is indicated. Likewise, this is the same for position sensor signal 533. If the sensed signal 533 remains between an upper limit 584 and a lower limit 585, a normal unobstructed closure is indicated. And further, if latch signal 537 makes a transition from low to high in an expected timeframe as defined by a lower time limit 588 and an upper time limit 589, a normal unobstructed closure is indicated. It should be appreciated that the deviation of any of the sensed signals outside of expected limits indicates that a person or object has come into proximity to, or made contact with, the moving panel and entrapment may have occurred.

With the three modalities, proximity and pinch sensing, panel position over time, and latch time, an overlapping of means and methods, shown as area 553 of FIG. 56, are employed to help ensure that if an obstruction occurs, it will be detected and indicated.

One can see that the fusion of multiple sensors and sensing methods provide a superior anti-entrapment system to provide greater safety in the operation of moving panels to help ensure that no person or object can be trapped without providing a signal indicating such, so that necessary action can be taken. It should be appreciated that other sense means such as use of a camera, radar, lidar, ultrasonics, and thermal imaging all for face/object recognition may be employed to further enhance the system.

Figure 58:
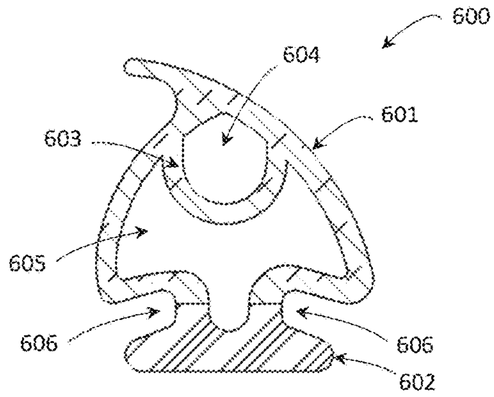
FIG. 58 is a sectional view of a moving panel weather seal, according to an embodiment of the present invention.
Figure 59:
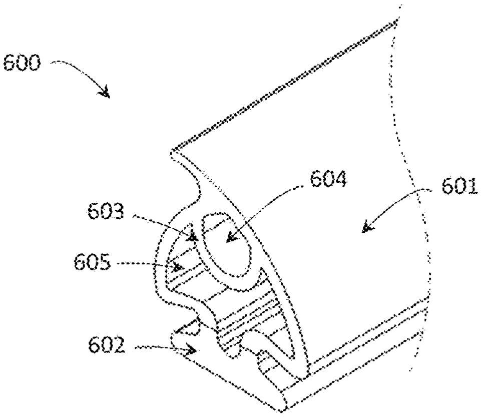
FIG. 59 is a perspective view of a moving panel weather seal, according to an embodiment of the present invention.

Referring now to FIG. 58 and FIG. 59, a movable panel weather seal 600, according to one embodiment of the present invention, is shown that can be used in a door sealing system. The weather seal 600 includes a top portion 601 and a bottom portion 602. The top portion 601 is made of an elastomeric foam and the bottom portion 602 is made of a solid elastomeric. The bottom portion 602 of the weather seal 600 can be made with a material that has electrical conductivity or a material that is electrically insulative. The weather seal 600 includes a plurality of, at least two internal cavities created by extruding an internal wall 603 that creates a first cavity 604 that is separate from a second cavity 605. The weather seal 600 can be formed with features such as recessed areas 606 so that an advantageous attachment method, such as a T-slot mount, can be employed.

Figure 60:
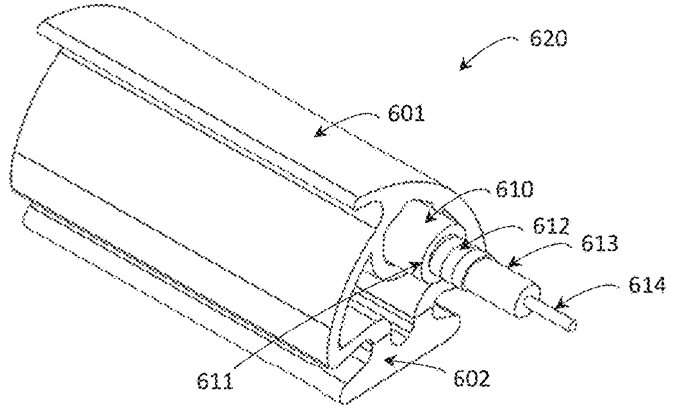
FIG. 60 is a perspective view of a moving panel weather seal with a sensor shown extended from the seal for clarity, according to an embodiment of the present invention.

Referring now to FIG. 60 with continual reference to FIG. 58 and FIG. 59, a sensor 610 can be inserted or coextruded into the weather seal 600. The sensor 610 includes an outer jacket 611 of a flexible non-conductive material, a circular electrically conductive sensing element 612, a dielectric layer 613, and a center electrically conductive element 614, all of which are concentric about a center element 614. It should be appreciated that the electrically conductive elements could be metallic or a conductive thermoplastic elastomer (TPE). The sensor 610 provides a signal that can be analyzed to determine if a person or an object is in proximity to the weather seal 600 or if the weather seal 600 is being compressed. The weather seal 600 has the first cavity 604 extruded of a desirable shape that is bounded by the wall 603 and a portion of elastomeric foam of the top portion 601. The sensor 610 is placed into the first cavity 604 to present the sensor 610 as close as possible to an object coming into proximity of the weather seal 600 and to offset the sensing element 612 a given distance from the rubber compound of the bottom portion 602 and a mounting surface. It should be appreciated, that in another embodiment, the sensor components may be coextruded with the elastomeric foam of the top portion 601 to form a sensor system 620.

Figure 61:
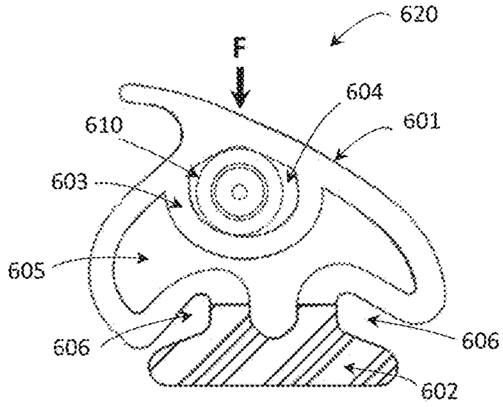
FIG. 61 is a sectional view of FIG. 60 illustrating the sensor integral to the moving panel weather seal with a force applied to the weather seal showing the compression thereof.

The sensor 610 of FIG. 60 and FIG. 61 senses a change in capacitance according to the well-known formula for capacitance, $$c = \frac{\varepsilon_0 \varepsilon_r d}{A},$$

either by proximity to an electrically conductive object or by compression of the top portion 601 of the weather seal 600 by any object, thereby placing the sensor 610 closer to electrically conductive material of the bottom portion 602. It should be appreciated that an object sensing control such as controller 521 of FIG. 46 monitors the capacitance of the sensor 610 and determines if an object or person is in proximity to or has made contact with the sensor 610.

Figure 49:
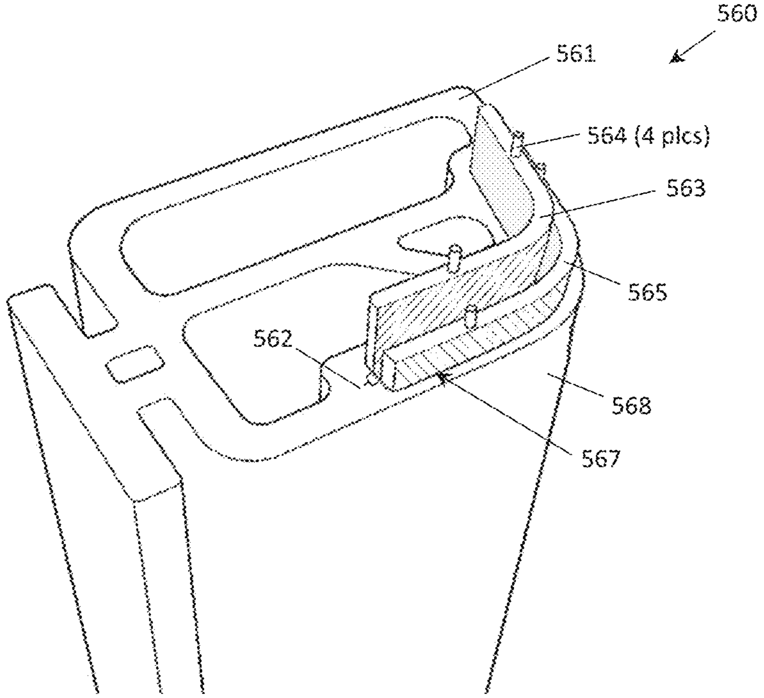
FIG. 49 is a perspective fragmentary view of a moving panel nosing seal with sensing elements shown extended from nosing for clarity, according to an embodiment of the present invention.

The sensor system 620 may be used as a substitute for, or in conjunction with, the previously described nosing sensor 560 as shown in FIG. 48 and FIG. 49.

While exemplary embodiments are described above, it is not intended that these embodiments describe all possible forms of the present invention. The words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A bus comprising:

a vehicle body having a door opening;

a plurality of doors attached to the vehicle body to open and close the door opening;

a nosing seal disposed on one of the doors and a weather seal disposed on another of the doors, the nosing seal and weather seal mating together when the doors are closed;

at least one sensor disposed inside the weather seal, wherein the at least one sensor capacitively couples to an electrically conductive moving object proximal to the weather seal such that a capacitance of the at least one sensor changes;

a controller coupled to the at least one sensor, the controller analyzing the sensing by the at least one sensor and senses a non-smooth signal from the at least one sensor and determines that an obstruction is present, senses signal fluctuation from the at least one sensor is not monotonic and determines that the obstruction is present, senses that the one of the doors has not closed after a predetermined time period and determines that the obstruction is present, senses that one of the doors has stalled and determines that the obstruction is present, the controller being configured to alert an operator of the bus when the obstruction is present.

2. The bus as set forth in claim 1 wherein the at least one sensor is an object detection sensor embedded in the weather seal.

3. The bus as set forth in claim 1 wherein the at least one sensor is mounted into the weather seal.

4. The bus as set forth in claim 3 wherein the at least one sensor comprises a plurality of sensing elements, a plurality of conductors, and a dielectric layer.

5. The bus as set forth in claim 4 wherein the weather seal includes an outer surface and the at least one sensor being proximal to the outer surface.

6. The bus as set forth in claim 4 wherein the sensing elements are an electrically conductive thermoplastic elastomer (TPE).

7. The bus as set forth in claim 4 wherein the conductors are concentric metal conductors extending along a length of the weather seal.

8. The bus as set forth in claim 4 wherein the dielectric layer is either one of a formable material and a compressible material.

9. A seal for a movable panel comprising:

a weather seal;

at least one sensor disposed inside the weather seal, wherein the at least one sensor capacitively couples to an electrically conductive moving object proximal to the weather seal such that a capacitance of the at least one sensor changes.

10. The seal as set forth in claim 9 wherein the at least one sensor is an object detection sensor embedded in the weather seal.

11. The seal as set forth in claim 9 wherein the at least one sensor is coextruded into the weather seal.

12. The seal as set forth in claim 9 wherein the at least one sensor is mounted into the weather seal.

13. The seal as set forth in claim 12 wherein the at least one sensor comprises a plurality of sensing elements, and a dielectric layer.

14. The seal as set forth in claim 13 wherein the weather seal includes an outer surface and one of the sensing elements being proximal to the outer surface.

15. The seal as set forth in claim 13 wherein the sensing elements are an electrically conductive thermoplastic elastomer (TPE).

16. The seal as set forth in claim 13 wherein the conductors are metal wires extended along a length of the sensing elements.

17. The seal as set forth in claim 13 wherein the dielectric layer is either one of a formable material and a compressible material.

18. A sensor system for a bus having a vehicle body comprising:

a plurality of doors attached to the vehicle body to open and close a door opening;

a weather seal disposed on one of the doors and a nosing seal disposed on another of the doors, the weather seal and nosing seal mating together when the doors are closed;

a plurality of sensors mounted in the weather seal to couple with an electrically conductive moving object proximal to one of the sensors;

a controller coupled to the sensors, the controller analyzing the sensing by the sensors and senses a non-smooth signal from the sensors and determines that an obstruction is present, senses signal fluctuation from the sensors is not monotonic and determines that the obstruction is present, senses that the one of the doors has not closed after a predetermined time period and determines that the obstruction is present, senses that one of the doors has stalled and determines that the obstruction is present, the controller being configured to alert an operator of the bus when the obstruction is present.

19. The sensor system of claim 18 wherein one of the sensors comprises a position sensor located in proximity to a pivot hinge of one of the doors and senses and provides absolute position of the one of the doors by providing a voltage that represents an angle $\alpha$ of the one of the doors.

20. The sensor system as set forth in claim 18 wherein one of the sensors comprises a latch sensor located on a door frame of the vehicle body by providing a latch signal.

21. The sensor system as set forth in claim 20 including a latch receiving portion on the nosing seal of the doors to sense and provide an indication when the doors are in a fully closed position when the latch sensor is activated by the latch receiver portion of the nosing seal.

22. The sensor system as set forth in claim 18 including a door motor drive to move the doors.

23. The sensor system as set forth in claim 22 wherein the door motor drive is an electric motor and provides object sensing control and motor pulse signals indicating a speed and direction of rotation of the door motor drive.

24. The sensor system as set forth in claim 22 wherein the door motor drive comprises a pneumatic actuator to move the doors.

25. The sensor system as set forth in claim 24 including a position sensor to provide a position sensor signal for object sensing control.

26. The sensor system as set forth in claim 22 including a vehicle control module to control the door drive motor.

27. The sensor system as set forth in claim 18 wherein the sensors comprise capacitive sensors.

28. The sensor system as set forth in claim 27 wherein the weather seal includes at least one of the capacitive sensors.

* * * * *